US012194667B2

United States Patent
Chen et al.

(10) Patent No.: US 12,194,667 B2
(45) Date of Patent: Jan. 14, 2025

(54) HIGH TEMPERATURE RESISTANCE MATERIALS COVERED AEROGEL INSULATION COMPOSITE MATERIAL AND PREPARATION METHOD THEREOF

(71) Applicant: Taiwan Aerogel Technology Material Co., Ltd., Tainan (TW)

(72) Inventors: Jean-Hong Chen, Tainan (TW); Cheng-Shu Chiang, Tainan (TW); Ya-Chi Ko, Tainan (TW); Chi-Hung Lo, Tainan (TW); Wen-Yen Hsu, Tainan (TW)

(73) Assignee: Taiwan Aerogel Technology Material Co., Ltd., Tainan (TW)

( * ) Notice: Subject to any disclaimer, the term of this patent is extended or adjusted under 35 U.S.C. 154(b) by 38 days.

(21) Appl. No.: 18/138,854

(22) Filed: Apr. 25, 2023

(65) Prior Publication Data
US 2024/0359379 A1   Oct. 31, 2024

(51) Int. Cl.
*B01J 13/00* (2006.01)
*B29C 45/00* (2006.01)
(Continued)

(52) U.S. Cl.
CPC ...... *B29C 45/7207* (2013.01); *B29C 45/0001* (2013.01); *B29C 45/0053* (2013.01);
(Continued)

(58) Field of Classification Search
CPC ............ B29C 45/7207; B29C 45/0053; B29C 45/1657; C08J 2205/026; C04B 14/064; B01J 13/0091
See application file for complete search history.

(56) References Cited

U.S. PATENT DOCUMENTS 10,639,606 B2 *   5/2020   Chen ..................... C01B 33/159
10,786,799 B2 *   9/2020   Chen ..................... B01J 13/185
(Continued)

OTHER PUBLICATIONS

Linhares, T., M.T. Pessoa de Amorim, L. Duraes, Silica aerogel composites with embedded fibres: a review on their preparation, properties and applications, J. Mater. Chem. A, vol. 7 (2019), pp. 22768-22802. (Year: 2019).*

(Continued)

*Primary Examiner* — Matthew J Daniels
(74) *Attorney, Agent, or Firm* — Locke Lord LLP; Tim Tingkang Xia, Esq.

(57) ABSTRACT

The present invention discloses a high temperature resistant outer layer covering aerogel composite material with low dielectric, high heat insulation and high fireproof characteristics and preparation method thereof. The method comprises steps of: (1) mixing hydrolysis, (2) condensation and dispersion, (3) structure molding, (4) atmospheric pressure drying, (5) outer layer covering, (6) curing molding and (7) surface treatment. In this technology, a trace amount of water-dispersible high temperature resistant glue is added to the aerogel sol in the step of condensation and dispersion, which is injected into the fiber-containing preformed structure, and dried at high temperature and atmospheric to prepare aerogel preformed materials. And then, the aerogel preformed materials are wrapped by a high temperature resistant material and cured to prepare the aerogel composite material with low dielectric, high heat insulation and high fireproof properties. The high temperature resistant outer layer of this technology contains single-layer, multi-layer or stacking and laminating multilayers, so that the product can be applied in fire prevention, energy saving and carbon reduction, especially application in the cleanroom or the thermal runaway safety protection of lithium battery module of electric vehicle.

20 Claims, 9 Drawing Sheets

(51) Int. Cl.

| | |
|---|---|
| *B29C 45/16* | (2006.01) |
| *B29C 45/72* | (2006.01) |
| *B32B 5/02* | (2006.01) |
| *B32B 5/18* | (2006.01) |
| *B32B 5/24* | (2006.01) |
| *B32B 7/12* | (2006.01) |
| *C01B 33/145* | (2006.01) |
| *C09K 21/02* | (2006.01) |
| *C09K 21/14* | (2006.01) |
| *B29K 63/00* | (2006.01) |
| *B29K 79/00* | (2006.01) |
| *B29K 105/00* | (2006.01) |

(52) U.S. Cl.
CPC ............ *B29C 45/1657* (2013.01); *B32B 5/02* (2013.01); *B32B 5/18* (2013.01); *B32B 5/245* (2013.01); *B32B 7/12* (2013.01); *C01B 33/145* (2013.01); *C09K 21/02* (2013.01); *C09K 21/14* (2013.01); *B29C 2045/0079* (2013.01); *B29K 2063/00* (2013.01); *B29K 2079/08* (2013.01); *B29K 2105/0061* (2013.01); *B29K 2995/0016* (2013.01); *B32B 2260/021* (2013.01); *B32B 2260/046* (2013.01); *B32B 2266/0214* (2013.01); *B32B 2266/126* (2016.11); *B32B 2307/3065* (2013.01)

(56) References Cited

U.S. PATENT DOCUMENTS

| | | | |
|---|---|---|---|
| 11,447,633 B2* | 9/2022 | Chen | C08G 77/26 |
| 11,767,670 B2* | 9/2023 | Chen | E04B 1/78 516/111 |
| 11,878,911 B2* | 1/2024 | Chen | C01B 33/1585 |
| 12,054,585 B2* | 8/2024 | Chen | C01B 33/1585 |

OTHER PUBLICATIONS

Lamy-Mendes, A., R.F. Silva, L. Duraes, Advances in carbon nanostructures-silica aerogel composites: a review, J. Mater. Chem. A, vol. 6 (2018), pp. 1340-1369. (Year: 2018).*

Yang, X., Y. Sun, D. Shi, J. Liu, Experimental investigation on mechanical properties of a fiber-reinforced silica aerogel composite, Materials Science and Engineering A, vol. 528 (2011), pp. 4830-4836. (Year: 2011).*

* cited by examiner

HIGH TEMPERATURE RESISTANCE MATERIALS COVERED AEROGEL INSULATION COMPOSITE MATERIAL AND PREPARATION METHOD THEREOF

FIELD OF THE INVENTION

The present invention relates to a kind of aerogel coated with high temperature resistant material, especially to a kind of aerogel composite material with no dust, high heat insulation, high fireproof and low dielectric, and its preparation method.

BACKGROUND OF THE INVENTION

As we all know, aerogel is a porous material with a three-dimensional network microstructure. It has a porosity higher than 80% (even higher than 95%) and has a low density (about 0.005 to 0.2 g/cm$^3$), high specific surface area (500 to 2,000 m$^2$/g), low thermal conductivity (k=15 to 40 mW/mk), low-dielectric properties ($D_k$=1.3 to 2.5), low-dielectric loss ($D_f$<0.003 or less) and other characteristics so as to make aerogel or its composite materials have excellent properties such as high heat insulation, high fireproof, and low dielectric. Since aerogel or its composite material has a large amount of porosity and extremely low density, it has high value in applications such as high heat insulation, high fireproof, low signal transmission resistance, and high electrical shock resistance. Therefore, it has a strategic position in the application of energy saving and carbon reduction in various industries such as high temperature fire prevention, high energy consumption production equipment or transmission pipelines in the future. Although the current general organic foam materials have a good heat insulation effect at room temperature or below 120 degrees Celsius, the preparation process of these organic foam materials has caused environmental pollution. Moreover, if the product is used in an environment with a temperature higher than 120 degrees Celsius, it will quickly crack and lose its heat insulation effect. In an environment with a temperature of 120 degrees Celsius or higher, organic foam materials will have their application limitations. In addition, general inorganic fiber heat insulation products can be used for high temperature heat insulation, but their barrier properties for long-term heat sources are not superior. Therefore, for energy saving and carbon reduction applications in the future, it is necessary to replace traditional organic foam materials or inorganic fiber insulation products with better aerogels or related composite materials, so as to improve heat insulation efficiency and energy utilization for improving the effect of energy saving and carbon reduction and reducing the carbon emission of the product process. In addition, high-frequency applications such as fast-transmission data transmission equipment such as 5G and 6G, and high-speed transmission of electric self-driving cars in the future, also urgently need to have dielectric materials such as low dielectric constant ($D_k$<2.5), low dielectric loss ($D_f$<0.003) and high resistance to electric shock. According to the basic material theory, the internal porosity of the material will significantly reduce the transmission of thermal energy and electron holes, so the higher the porosity of the material structure induces the better its dielectric properties. Therefore, in addition to preventing heat dissipation, the submicron-scale and nano-scale porous silica aerogel material can also be used in 5G, 6G and other fast-transmitting data transmission equipment. Because the porous silica aerogel significantly reduces the dielectric constant and dielectric loss, it can also increase the signal transmission efficiency and reduce the signal loss when applied at the signal transmission end and the signal receiving end. In the future, it will also have application value in the self-driving vehicles or spacecraft. However, the aerogel materials have the above excellent heat insulation and dielectric effects, but there is only a weak van der Waals force between the molecules inside the material, so aerogel-related products are very easy to cause dust to fall off. Therefore, aerogel related products are not yet suitable for use in harsh environments such as clean rooms. In this regard, the team of the present invention expects to develop aerogel-related products applied to energy-saving and carbon-reducing materials in clean room processes and high temperature insulation materials such as high-speed transmission of electric vehicles and thermal runaway of lithium batteries. It is an urgent goal to effectively solve the hazards caused by aerogel nano-dust diffusion or dust falling. At present, among the various aerogel materials with coating technologies disclosed in international published patents, it is still impossible to completely suppress the doubts about the leakage of nano-aerogel dust, especially at high temperatures above 200 degrees Celsius. The currently disclosed technologies use organic series of coating materials, for example, films such as polypropylene, polyester, polyimide, and fluoropolymer, which are heated in a high-temperature environment for a long time, and the related organic films will gradually age and deteriorate. It will eventually cause serious phenomena such as aerogel dust leakage or dust falling. These phenomena are still an important problem that needs to be solved for clean rooms or high-temperature barrier materials for electric vehicles and lithium batteries.

The traditional aerogel preparation method is a sol-gel synthesis method, which mainly mixes precursors such as alkoxysilane, methyl ortzhosilicate or water glass with a large amount of organic mixed solvent, and then acid catalyst is added for hydrolysis. After the hydrolysis reaction for a certain period of time, an alkali catalyst is added to carry out the condensation reaction. The sol will gradually form during the condensation reaction and the molecules in the sol will continue to react and bond to gradually form a semi-solid polymer gel. Then, after a period of aging, the gel forms a three-dimensional network structure with stable structure. Finally, n-butanol, n-hexanol, n-hexane or cyclohexane and other hydrophobic solvents is used for solvent replacement, and then a supercritical drying technology is used to extract and dry the solvent in the aerogel structure. In addition to the consumption of large and expensive organic solvents and supercritical equipment, the traditional process technology also needs to use hydrophobic solvents for long-term solvent replacement, so the cost of preparing aerogels is high and time-consuming.

On the other hand, the preparation method of the hydrophobic aerogel also adopts the sol-gel synthesis method, which is mainly to mix methyltrimethoxysilane (MTMS) or methyltriethoxysilane (MTES) and other methyl silicon alkoxide precursors with organic solvent firstly, and then an alkali catalyst is added to carry out the hydrolysis reaction. After the hydrolysis reaction for a certain period of time, the condensation reaction is carried out. During the condensation reaction, a sol will be gradually formed, and the molecules in the sol will continue to react and bond so as to form a semi-solid polymer gel gradually. After aging for a period of time, the solvent replacement is proceeded with solvents such as isopropanol, acetone, n-hexane or cyclohexane for two to three days, so that the hydrophobic gel forms a stable three-dimensional network structure. Finally, the solvent in the aerogel structure is dried by normal pressure drying technology to obtain porous and dry aerogel blocks. The manufacturing process of the hydrophobic aerogel also consumes a large amount of expensive organic solvents, and requires long-term solvent replacement with alcohols or alkanes, so the preparation is time-consuming and expensive.

Due to the process technology adopted in the above-mentioned aerogel preparation method, a large amount of hydrophobic solvents such as alkanes and other organic solvents must be utilized, and multiple solvent replacements for two to three days are performed. Then, a supercritical drying technology or a normal pressure high temperature drying technology is used to avoid the shrinkage or cracking of the aerogel structure being produced and affected by the surface tension of water molecules during the normal pressure drying process. "Supercritical drying" means that water and organic solvents are in a supercritical state under high temperature and high pressure, so that the organic solvent and water have a gas-liquid mixing property at the same time, and the solvent is directly vaporized and dried under the supercritical state.

Therefore, the residual solvent in the network structure can be removed under supercritical conditions without causing the wet glue to shrink. However, the use of multiple hydrophobic solvent replacement techniques and supercritical drying techniques in related processes is time-consuming and expensive, which is not conducive to the mass production of aerogel and the competitiveness of future applications. The above-mentioned hydrophobic modification is based on the multi-step solvent replacement technology at normal temperature and pressure, but this modification technology needs to be carried out for more than 24 hours, and the time required for the process is too long to be cost-effective.

"The insulation piece and heating assembly" described in the Chinese Invention Publication No. CN 113873697A and the Republic of China Invention Publication No. TW 1750717 mainly discloses an insulation piece and heating assembly. The insulation piece includes a heat insulation material and a first covering heat insulation material, and the first covering heat insulation material is sewn along a first sewing position to seal the heat insulation material. The above-mentioned insulation piece can prevent the dust generated by the heat insulating material from flying away. At the same time, it also provides a heating assembly including the above-mentioned insulation piece. However, due to the extremely small particle size of aerogel dust, the aerogel material is covered with a coating layer of silicone rubber, copper-based alkanes lubricating oil, non-soap-based synthetic lubricating oil, lithium-based pressure-resistant grease, silicon-based grease, and molybdenum disulfide butter, and then the coating layer is sewn with sewing thread. Although it can reduce the escape of aerogel dust, it still cannot effectively completely prevent the leakage of submicron and below aerogel dust and cause internal pollution in the clean room.

"The flexible composite aerogel and its manufacturing method" described in the Republic of China Invention Publication No. TW 201542457 mainly relates to a direct dispersion preparation method of a hydrophilic aerogel. The method of the present invention relates to a flexible composite organic aerogel comprising a textile reinforcement in which an organic aerogel is placed. The organic aerogel is based on a resin at least partly derived from polyhydroxybenzene and formaldehyde, which is a polymeric organogel containing at least one water-soluble cationic polyelectrolyte, or the thermal decomposition product of the gel in the form of the organic aerogel porous carbon monolith, which comprises the pyrolysis product of the at least one water-soluble cationic polyelectrolyte.

"The aerogel composites and the method for preparing the same" described in the Republic of China Invention Publication No. TW 1655094 mainly relates to aerogel composites. The aerogel composites include at least one base layer having an upper surface and a lower surface, and the base layer includes a reinforcing aerogel composition which includes a reinforcing material and a monolithic aerogel frame; a first cover layer includes a first cover material adhered to the upper surface of the base layer; and a second cover layer includes a second cover material adhered to the lower surface of the base layer. At least a portion of the monolithic aerogel frame of the base layer extends into a portion of both the first cover layer and the second cover layer. The first cover material and the second cover material may each consist essentially of elastic fibers such as spandex, nylon, lycra, spring fibers or combinations thereof, or consists mainly of elastic fibers. However, the prepared aerogel covering material contains elastic fibers or soft polymer sheets, and the used adhesive materials are also organic adhesives such as acrylate, urethane, and hot melt adhesive. Although related soft products have good encapsulation properties for aerogels.

"The aerogel composites and its preparation method" described in the Republic of China Invention Publication No. TW 1663062 comprises: wetting at least one of inorganic fibers and organic fibers to form a fibrous material; laminating the wetted fibrous material and a spacer in a roll-up configuration or a planar form; filling the fibrous material into a container; injecting a precursor into the container and gelling the precursor at the same time to remove residual air bubbles under vacuum so as to prepare a gel-fiber composite; taking the aerogel-fiber composite from the container and removing the spacer; utilizing solvent substitution and organic surface modification to deal with the gel-fiber composite, and then drying the organic surface-modified gel-fiber composite by atmospheric pressure drying or supercritical drying.

"The laminated body comprising the reinforced aerogel composites" described in the Republic of China Invention Publication No. TW 1743082 relates to an aerogel composites material. The aerogel composites material includes at least one base layer having a top surface and a bottom surface, and the base layer includes a reinforced aerogel composition and a monolithic reinforced aerogel frame. The reinforced aerogel composition includes a reinforcing material, a first facing layer comprising a first facing material attached to the top surface of the base layer, and a second facing layer comprising a second facing material attached to the bottom surface of the base layer. At least a portion of the monolithic aerogel frame of the base layer extends to at least a portion of both the first and second facing layers. The first facing material and the second facing material each consist essentially of the fluoropolymer materials.

"The Manufacturing Method of Aerogel Felt" described in the Republic of China Invention Publication No. TW 1765609 relates to a manufacturing method of aerogel felt, which firstly injects aerogel slurry into a glass fiber felt. Then, the soaking liquid is used to form a closed coating layer on the surface of the glass fiber felt to avoid the phenomenon of particle falling off during the storage, transportation and use of the aerogel felt. Therefore, it can be ensured that the amount of aerogel in the aerogel felt does not decrease, thereby not affecting the thermal insulation performance of the aerogel felt, wherein the closed coating layer is selected from acrylic emulsion, talc, VAE emulsion and water-based curing agent mixture.

"The non-woven/aerogel composite fireproof/insulation material and its preparation method" described in the Republic of China Invention Publication No. TW 1535658 invented by our team is disclosed to prepare an aerogel through a hydrolysis step and a condensation step. Then, in the forming step, the aerogel is taken and added to a non-woven fabric so that the aerogel is fully interspersed in the non-woven fabric, and a drying process is performed to form a non-woven/aerogel composite fireproof/thermal insulation material through making the aerogel fully interpenetrate in the non-woven fabric by impregnation processing or continuous rolling. The conditions of this drying process are drying anhydrous aerogels at normal temperature and pressure or using the organic solution between 30° C. and 80° C. for rapid vaporization and drying.

"The method for preparing an aerogel/composite non-woven fireproof insulation material" described in the Republic of China Invention Publication No. TW 1643888 invented by our team is disclosed to form a condensation solution of an ungelled silica gel-silicon aerogel-silane coupling agent aerogel solution through a mixing step, a hydrolysis step and a condensation step. Then, during the molding step, the condensed solution of the ungelled silica gel-silica aerogel-silane coupling agent aerogel solution is continuously sucked by impregnation, spraying, showering or pressure suction to a recycled composite non-woven blanket or a general non-woven blanket, so that the silica gel-silica aerogel-silane coupling agent aerogel is gelled and interspersed in the non-woven blanket. And it goes through a drying process to form an aerogel/composite non-woven fireproof heat insulation material, wherein the conditions of the drying process are aerogel drying at normal temperature and pressure, or a rapid vaporization drying process of an organic solution between 30 degrees Celsius and 80 degrees Celsius. The non-woven fabric is made by one of polyethylene (PE), polypropylene (PP), polyester, polyamide, glass fiber, ceramic fibers, carbon fiber or a combination thereof to make an aerogel composite material that does not shed dust.

Although the above-mentioned invention patents are all related to the manufacturing technology of aerogel composite fiber blankets or heat insulation materials, no matter whether they adopt the direct preparation method, or utilize different organic slurry soaking methods, or utilize the organic glue material bonding method, and the previous technology of our team uses the soft silica gel blending method, it still has the shortcoming that aerogel fine dust is easy to fall from the aerogel fiber composite blanket. When the aerogel composite fiber blanket is easy to drop powder, the high temperature resistance and heat insulation performance of the aerogel will gradually decrease, especially at high temperatures above 180 degrees. The organic aerogels, organic coating materials, organic modifiers or organic adhesives used in the above invention patents will rapidly age and crack under the process conditions of 180~200 degrees, so the coating effect will decrease and a large amount of organic particles or aerogel dust will leak.

The high-temperature aging and cracking of the above organic materials will lead to the leakage of aerogel dust, which will cause pollution in high-tech industries such as clean rooms or electric vehicles. This is the biggest shortcoming of aerogel insulation materials. The main reason for serious dust leakage of aerogel or its composite materials is that the internal aerogel molecules only have weak forces to condense and aggregate to form a three-dimensional network of porous structures. Therefore, silicon-based aerogels or organic-inorganic composite materials are very easy to generate nanometer to micron-sized aerogel dust during high-temperature applications. These aerogel dusts have always caused the main problem that aerogel cannot be quickly applied in high-tech industries. Especially in the high-tech industry, the precision process is mainly inside the clean room, so aerogel dust pollution to the high-tech industry or clean room has always been the main concern or problem that prevents high-insulation aerogel energy-saving materials from being used in high-tech industry production lines.

In response to some deficiencies in the application caused by the above-mentioned aerogel dust, the inventor initiates an improved idea, and further improves research and development and creation. After a long period of hard work, the present invention is finally produced. The main purpose of the present invention is to provide a method for manufacturing an inorganic material covering silicon-based aerogel composite material with high strength, processability, high fireproof, high heat insulation performance and antistatic properties.

SUMMARY OF THE INVENTION

Therefore, in order to improve the shortcoming that aerogel dust leakage in the current use of polyester or polyimide organic film covering aerogel products is easily caused by aging or cracking during long-term application, the purpose of the technology of the present invention is to provide a like-fiber reinforced plastic (LFRP) inorganic covering silicon-based aerogel composite material with high strength, high fireproof, high heat insulation, low dielectric and dust leakage prevention. The product of this technology has the properties of high strength, high hardness, high heat insulation and high fireproof, and can be applied to the high temperature process of clean room and the safety protection of thermal runaway of lithium battery module of electric vehicle. Another object of the technology of the present invention is to provide an improved preparation technology of aerogel composite materials, which adds a very small amount of water-dispersible high temperature resistant adhesive material to the suspension dispersion solution of nano-sized to sub-micron-sized wet gel particles to prepare aerogel structural composite materials with high heat insulation efficiency, high fireproof and no dust.

Therefore, another main purpose of the present invention is to provide a high thermal insulation and a high thermal conductivity or provide a low dielectric and a high electrical conductivity surface layer on the two sides of the outer layer of the aerogel product, so as to be suitable for the thermal insulation layer covering the outer of the high temperature pipeline in the clean room or the machinery platform with the thermal insulation layer to reduce the heat loss in the pipeline or the interface of the machinery platform to improve the energy saving and carbon reduction effect. The conductive technology is used to provide high temperature pipelines to conduct external conduction of the heat insulation layer covering the high temperature pipeline and the platform to reduce the generation of frictional static electricity. The other main purpose of the present invention is to provide a composite structure with high fireproof outside and high heat insulation inside, which is suitable for the heat dissipation barrier of the lithium battery module of the electric vehicle, so as to avoid thermal runaway of the lithium battery module of the electric vehicle and increase the safety of the electric vehicle.

In this technology, at first in the aerogel preparation process, the condensation solution is dispersed in a large amount of dispersion solution by suspension dispersion technology, and then a small amount of high temperature resistant adhesive material is added to disperse evenly. Then, the suspension dispersion solution is injected into the preformed fiber blanket, and after gel forming and atmospheric pressure drying, the aerogel fiber preformed composite structural material with low thermal conductivity and high fireproof can be prepared. Then, a fiber cloth containing high temperature resistant resin or high temperature resistant non-organic film is further used to cover the surface layer of the preformed aerogel structural material, and then a high temperature curing to cross-link and cure the fiber cloth containing high temperature resistant resin or high temperature resistant non-organic film and glue material is performed so as to prepare a product whose surface layer is high-strength and high-density like-fiber reinforced plastic (LFRP) covering high heat insulation and high fireproof aerogel blanket. The product of this combination will be a covering aerogel composite material that does not shed dust, high heat insulation efficiency, high fireproof, low dielectric or antistatic.

The present invention is about a kind of high temperature resistant material covering aerogel, especially about a kind of aerogel composite material with no dust, high heat insulation, high fire prevention and low dielectric, wherein the implementation mode of the present invention comprises: (1) a mixing hydrolysis step: adding a siloxane precursor to an aqueous ethanol solution and stirring to form a mixed solution, wherein the siloxane precursor comprises one or a combination of a siloxane compound and a hydrophobic siloxane compound substituted with a different alkyl chain length, and then adding an acid catalyst to the mixed solution to carry out the hydrolysis reaction; (2) a condensation dispersion step: adding a large amount of dispersed aqueous solution to the mixed solution for rapid stirring, so that the condensation solution is suspended and dispersed in the aqueous solution, wherein the dispersion solution comprises an alkali catalyst for condensation reaction to form a suspension dispersion submicron condensation solution, and then a small amount of water-dispersible high temperature resistant adhesive can be added to the suspension dispersion submicron condensation solution system; (3) a structure molding step: injecting the suspension dispersion sol solution into a preformed model to promote a further condensation of the dispersion sol solution to form a preformed structure of a like-solid aerogel wet glue; in addition, the suspension dispersion sol solution can be injected into a preformed model to promote a further condensation of the dispersion sol solution to form a preformed structure of a like-solid aerogel wet glue; in addition, the suspension dispersion sol solution can also be injected into a fiber-containing material model to impel the suspension dispersion sol solution to further condense in a fiber-containing material preformed model so as to form a like-solid aerogel wet glue preformed composite structure containing a fiber-containing material, and the surface of the aerogel structure is covered with a small amount of water-dispersible high temperature resistant adhesive material; (4) an atmospheric pressure drying step: using a high temperature oven combined with microwave technology, wherein the high-temperature oven is used to provide a atmospheric pressure and a high temperature drying airflow so as to promote the rapid vaporization of the solvent in this type of like-solid aerogel molding structure; in addition, the microwave technology with the rotation frequency of water molecules is used to promote the rapid rotation of water molecules inside the aerogel molding structure so as to destroy the hydrogen bonds of water molecules, so that the shrinkage and cracking of the aerogel structure caused by the interfacial tension of water molecules can be suppressed during the drying process; a preformed aerogel material with a porous structure, low heat transfer and low dielectric can be quickly obtained by combining the above technologies; (5) an outer layer covering step: preparing a high temperature resistant adhesive solution above 300 degrees, and impregnating or spraying the adhesive solution on the surface of a high temperature resistant fiber cloth or an inorganic template, and then further using the high temperature resistant fiber cloth or non-organic sheet impregnated with the adhesive solution to perform multi-layer covering of aerogel preformed materials; (6) a curing molding step: the aerogel preformed material covered with multi-layer high temperature resistant fiber cloth/non-organic membrane plate containing high temperature resistant adhesive material is cured and molded in a high temperature curing environment to obtain a like-fiber reinforced plastic covering aerogel composite material with high strength, high density and no dust shedding; the outer layer prepared by the above process technology is a high strength, high modulus and high density like-fiber reinforced plastic (LFRP) cladding layer, and the inner layer is an aerogel structural composite material with high heat insulation and low dielectric containing a small amount of high temperature resistant adhesive material, so the product of this combination will be an aerogel composite structural material that does not shed dust and has high heat insulation efficiency; and (7) a surface treatment step: the high strength and high density LFRP covering high-insulation aerogel blanket is used for surface treatment of the FRP cladding layer by surface treatment technologies comprising a high pressure air jet, sandblasting, water grinding wheel or dry grinding wheel, and surface oiling, so the aerogel composite structural material combined with this process will have high strength, high heat resistance, no dust loss and high heat insulation efficiency.

Further, in the mixing hydrolysis step (1), the siloxane compound is one or more substances selected from the group consisting of tetramethoxysilane (TMOS) and tetraethoxysilane (TEOS), and the hydrophobic modified siloxane compound is one or more substances selected from the group consisting of methyltrimethoxysilane (MTMS), propyltrimethoxysilane (PTMS), hexyltrimethoxysilane (HTMS), octyltrimethoxysilane (OTMS), and hexamethyldisilazane (HMDS), which are hydrophobic siloxanes substituted with different alkyl chain lengths, wherein in the overall mixed solution, the molar ratio of the siloxane compound to the hydrophobic modified siloxane compound is between 0:100 mol % and 95:5 mol %, and the purpose of adding the hydrophobic modified siloxane compound is to reduce the cracking of the aerogel structure during the drying process; on the other hand, the purpose of adding the siloxane compound is to regulate the internal fine structure of the aerogel structure and increase the hole structure and porosity in the structure, so as to reduce the heat conduction property or improve the heat insulation property.

Further, in the mixed hydrolysis step (1), when the content ratio of the acid catalyst in the mixed solution is higher, the hydrolysis rate is faster. But containing a large amount of acid ions will produce ionic dielectric properties under the action of an electric field, so it will make the dielectric properties and dielectric loss of the aerogel be higher. Relatively, the lower the content ratio of the acid catalyst will induce the slower the overall hydrolysis rate. Therefore, the present invention increases the hydrolysis rate of trace acid ions by reducing the acid catalyst content accompanied by increasing the process temperature, so the content of the added acid radical ions and condensed base ions can be significantly reduced. On the other hand, siloxane compounds and hydrophobized siloxane compounds will produce a large number of alcohol molecules during the hydrolysis process. Therefore, deionized water is used to replace organic solvents such as ammonia and alkanes during the hydrolysis process, thereby reducing the addition of ammonia and alkanes. In addition to reducing the influence of organic solvents such as ammonia water on the dielectric properties of aerogel, it can also reduce the hazards of organic solvent treatment and environmental pollution during the manufacturing process, and can also reduce the overall cost of aerogel preparation.

Further, in the mixed hydrolysis step (1), in the overall mixed solution, the higher the solvent content will induce the higher the porosity in the subsequent dried wet glue particles; relatively, in the overall mixed solution, the lower the solvent content will induce the lower the porosity in the subsequent dried wet glue particles. The solvent comprises ethanol, recycled ethanol in water, recycled methanol in water, recycled water, deionized water, filtered water, distilled water, or combinations thereof.

Further, in the condensation dispersion step, with the addition of a large amount of ethanol-containing aqueous solution containing a small amount of alkali catalyst, the mixed solution of siloxane molecules or hydrophobic siloxane molecules in the hydrolyzed solution is rapidly stirred by an emulsifier or a homogenizer, so that the hydrolyzed siloxane molecules or hydrophobic siloxane molecules will form nanometer to submicron circular molecular suspended oil droplets dispersed in a large amount of dispersed aqueous solution under the dilution and stirring of a large amount of dispersed aqueous solution.

One of the main purposes of using this step is to accelerate the hydrolyzed siloxane molecules or hydrophobic siloxane molecules under the dilution and stirring of a large amount of dispersed aqueous solution, which will form nano-sized to sub-micron round molecular suspended oil droplets to increase the reaction contact area and accelerate the condensation reaction rate so as to quickly age to form nanometer to submicron gel particles; another purpose of using this step is to form nano-sized to sub-micron wet gel particles in the subsequent drying process, and the drying rate will also be increased due to the obvious increase in its specific surface area.

Furthermore, in the above-mentioned condensation dispersion process (2), the present invention can also add a very small amount of water-soluble and dispersed high temperature resistant glue in the nanometer to submicron wet gel particles and dispersion water. The water-soluble and dispersed high temperature resistant adhesive material is utilized to coat the surface of the nanometer to submicron wet gel particles in the subsequent drying, and the coated glue is used as a stabilizer for the wet gel particle structure. Therefore, in this preparation method, the product is less prone to cracking, so organic solvents such as a large amount of hydrophobic toluene and n-hexane may not be added, and auxiliary agents such as surfactants may not be added during the preparation, so multiple replacement steps of hydrophobic organic solvents may be avoided.

Further, the structure molding step (3) includes preforming and forming steps: in the preforming step, the mixed suspension dispersion solution of hydrolyzed siloxane molecules and hydrophobic siloxane molecules formed at the nanometer level to the submicron level is injected into a preforming mold, so that the nanometer level to the submicron level wet gel particles are further condensed and aggregated to form a gel structure with a preformed structure, such as a tubular, plate-shaped or specific appearance type preformed gel structure of various sizes; in this technology, the nano- to sub-micron wet gel particles are aggregated to form a three-dimensional wet gel particle network structure, and the gelation is used to make the nano- to sub-micron aerogel wet gel condense and aggregate to form a mold structure, and a small amount of water-dispersible high temperature resistant glue is used to cover the surface of the aerogel structure to form an organic-inorganic composite structure; in another embodiment, the condensed suspension dispersion sol solution without condensation reaction can also be injected into a fiber-containing material pre-forming mold, so that the nanometer to sub-micron-sized hydrolyzed wet gel particles enter the pre-forming mold, and further condense and gather between the fiber structures to form a three-dimensional wet glue particle network structure. Using gelation can promote the combination of the silicon-based wet glue particles and the fiber material in the pre-forming mold, and then further condensation in the pre-forming mold can form a molding structure of a like-solid aerogel wet glue containing fiber materials. In addition, a small amount of water-dispersible high-temperature adhesive is used to cover the surface of the aerogel structure to form an organic-inorganic composite structure.

Furthermore, in the above-mentioned structure molding step (3), techniques such as impregnation technology, pressure suction technology, high-pressure injection, high-pressure bathing, high-pressure spraying or vacuum adsorption can also be used to inject the hydrolyzed siloxane molecule and hydrophobic siloxane molecule dispersion solution into a fiber-containing structure to perform composite processing of fiber-containing aerogel sheets.

Further, in the above-mentioned structure molding step (3), the high-temperature resistant glue above 300 degrees includes one or a combination of inorganic glue or thermosetting resin. Specifically, for example, one or a combination of various organic or inorganic adhesive materials is such as water glass, inorganic silicone resin, copper oxide-phosphate glue, silicate glue, phosphoric acid-silicate glue, sulfate glue, magnesium oxide-silicon dioxide-borax inorganic glue, epoxy resin, polyimide, polyetherimide, polyphenylene ether, polyphenylene sulfide, polyether ketone liquid crystal macromolecule, polytetrafluoroethylene, polymelamine, polyphenolic, polymelamine-formaldehyde, polyamide, polyamide ester, and silica gel. However, without limiting, the inorganic adhesive materials can also be made of materials such as inorganic glue used in fire retardant coatings. In some embodiments, the inorganic glue has a liquid medium and a solute dissolved in the liquid medium. The liquid medium is water, wherein the solute is selected from the group consisting of alkali metal silicate and/or alkali metal aluminate. It is composed of inorganic materials, dissolved in liquid medium, and includes silicon oxide ($SiO_2$), aluminum oxide ($Al_2O_3$), and alkali metal oxides ($M_2O$, M represents alkali metal elements). In addition, the inorganic glue includes one or more species selected from the group consisting of: phosphates, silicates, sulfates, borates, metal and metal oxides, wherein the phosphate is zirconium phosphate or phosphoric acid-oxidation copper, the silicate is aluminum silicate or water glass, and the metal and metal oxide is copper or aluminum or zirconium metal element and its oxide element.

Further, in the above-mentioned structure forming step (3), the high temperature resistant fibers in the present invention comprise metal fibers, inorganic fibers, liquid crystal fibers, and organic fibers; specifically, for example, various types of porous loose cotton, mats, paper, blanket, rope, thick board, etc., are prepared by various metal fibers or metal rods in micron to nanometer scale, glass fibers, carbon fibers, quartz fibers, ceramic fibers, rock wool fibers, Kevlar polyamide fibers, Nomex polyamide fibers, nylon fibers, polyester fibers, biodegradable inorganic fibers or biodegradable organic fibers.

Further, the atmospheric pressure drying step (4) includes: solvent azeotropic vaporization step (4-1): placing the pre-formed structure of the like-solid aerogel in combination with high temperature equipment and microwave equipment, using a high temperature oven, UV light or IR heat sources to provide a high temperature air flow at the azeotropic temperature of the mixed solvent, and combining the microwave frequency of the water molecule rotation frequency to impel the rapid rotation of water molecules in the aerogel molding structure with the microwave frequency and destroy the hydrogen bond of the water molecules in the aerogel structure to accelerate the drying rate of the product. Combining the above technologies can quickly dry the water molecules and alcohol molecules inside the aerogel structure, and inhibit the shrinkage and cracking of the aerogel structure caused by the interfacial tension of the water molecules. Generally, the rapid azeotropic vaporization temperature of a large number of mixed solvents in the like-solid aerogel molding structure is between 6° and 90° C.; solvent recovery (4-2): guiding the vaporized steam to a heat exchange recovery equipment in the azeotropic temperature environment; in the heat exchange recovery equipment, the water-containing alcohol is condensed and recovered, and the purpose of the recovery is to reduce costs and reduce environmental pollution; and bumping step (4-3): adjusting the temperature of the drying equipment of the preformed structure of the dried aerogel to a high temperature above the bumping temperature of the mixture, and combining the microwave frequency to rapidly rotate to destroy the hydrogen bonding of the water molecules in the aerogel structure, and quickly providing the frictional heat of the solvent molecules, so that the remaining mixed solvent inside the nearly dry aerogel produces rapid bumping to form a positive pressure and the positive pressure inside the aerogel structure is utilized to suppress the shrinkage of the aerogel during the drying process; in addition, the positive pressure inside the aerogel structure can also be used to promote the generation of a large number of nanoscale to sub-micron micro-thin pores during the expansion process of the aerogel structure, so as to improve the porosity and heat insulation properties of the aerogel product, wherein the bumping temperature is 110~180° C.

Further, in the outer layer covering step (5): preparing a high temperature resistant adhesive solution above 300 degrees comprising organic resins, inorganic resins or combinations thereof, which is impregnated or sprayed on a high temperature resistant fiber cloth, high temperature resistant non-organic film, or high temperature resistant non-organic sheet, so that the high temperature resistant adhesive material solution is evenly sprayed on the surface of the high temperature resistant fiber cloth, the high temperature non-organic film or high-temperature non-organic sheet, and then further the products such as high temperature materials containing high temperature adhesives materials are covered or coated on the surface of the aerogel preformed structural material.

Further, in the above outer layer covering step (5), one of the high temperature resistant non-organic film, high temperature resistant non-organic sheet or high temperature resistant fiber or a combination thereof, wherein the high temperature resistant non-organic film and high temperature resistant non-organic sheet comprise metal, inorganic and organic-inorganic composite and other high temperature resistant films and sheets. Further, the metal film and/or sheet comprises thin films prepared by metal materials such as aluminum, stainless steel, copper, or a combination thereof; the inorganic film/sheet comprises one or a combination of films and sheets prepared by mica sheets, graphite sheets, graphene sheets, glass sheets, various ceramics sheets, and metal oxides, metal nitrogen silicon compounds, and metal carbon silicon compounds; the organic-inorganic composite film comprises one or a combination of high temperature resistant organic-inorganic composite films, sheets or inorganic-inorganic composite films, sheets and other combinations manufactured by aluminum, stainless steel, copper, mica sheet, graphite, graphene, glass, ceramic, metal oxides, metal nitrogen silicon compounds and metal carbon-silicon compounds with various organic glues or various inorganic glues. Further, in the above-mentioned outer layer covering step (5), the high temperature resistant adhesive material solution includes one of inorganic glue, thermoplastic or thermosetting organic resin or a combination thereof, specifically, high temperature resistant inorganic glue such as water glass glue, inorganic silicone resin glue, copper oxide-phosphoric acid glue, silicate glue, phosphoric acid-silicate glue, sulfate glue, magnesium oxide-silicon dioxide-borax inorganic glue, etc. or a combination thereof; high temperature resistant thermosetting organic glue such as epoxy resin, polyimide resin, polyether amide resin, polyphenylene ether resin, polyphenylene sulfide resin, polyether ketone liquid crystal polymer resin, polytetrafluoroethylene resin, polymelamine resin, polyphenolic resin, polymelamine-formaldehyde resin, polyamide glue, polyamide ester glue, polyacrylic resin glue, silicon glue, etc. or combinations thereof.

Further, as a whole, the outer layer covering step has a solid content concentration of 10.0 to 75.0 wt % in the high temperature resistant adhesive material solution; the aerogel preformed composite material is covered with multiple layers of the fiber cloth sprayed or coated with the adhesive solution, the high temperature resistant non-organic film, or the high temperature resistant non-organic sheet. Among them, the lower the concentration of the high temperature resistant adhesive material solution will induce the better the efficiency of the adhesive material solution infiltrating inside the fiber cloth and the easier the processing, but induce the lower the compactness of the aerogel molding composite material covered with multi-layer fiber cloth impregnated with the adhesive material solution, and the higher the hole content in the structure, so the aerogel dust leakage is easier to occur; relatively, the higher the concentration of the high temperature resistant adhesive solution will induce the higher the content of the adhesive solution coated on the surface of the fiber cloth, and the higher the strength and the denser the aerogel molding composite material covered with multi-layer fiber cloths impregnated with the adhesive solution. It is less likely to produce aerogel dust leakage, but the processing is more difficult, and the film thickness is less easy to control. Therefore, the concentration of the impregnated adhesive material solution can be used to control the properties of molding processing and preventing dust from falling of multiple layers of fiber cloth impregnated with the high temperature resistant adhesive material solution covering the aerogel molding composite material. The optimum adhesive material solution concentration is between 30-50.0 wt %.

Further, the curing molding step (6) comprises solvent drying (6-1) and crosslinking and curing (6-2). In the solvent drying step, a fiber cloth or high temperature resistant film/high temperature resistant sheet impregnated or coated with the adhesive material solution covering the aerogel preformed composite material with multiple layers is placed at the boiling point temperature of the solvent of the impregnated adhesive material solution to promote the vaporization of the solvent of the adhesive material solution so as to reduce the formation of molding defects or bubble holes. If the adhesive material is a normal temperature curing resin, it will be accompanied by the curing of the resin during the solvent drying period, which is called a normal temperature drying and curing step, so as to form a like-fiber reinforced plastic (LFRP) with high strength, high density and without shedding dust inorganic covering silicon-based aerogel composites.

Further, a like-fiber reinforced plastic (LFRP) inorganic covering silicon-based aerogel composite material is provided here with high strength, high fireproof, high heat insulation, antistatic, and dust leakage prevention. The related products have high strength, high hardness, and high fireproof properties, and can be applied to high temperature processes in clean rooms and safety protection for thermal runaway of lithium battery modules for electric vehicles. The purpose of the present invention is to provide an improved aerogel composite material preparation technology to prepare an inorganic-coated aerogel structural composite material with high heat insulation efficiency, high fireproof and no dust loss; another object of the present invention is to provide a solution to improve the shortcomings of traditional organic film-coated silicon-based aerogels or organic-inorganic composite aerogels in high-temperature applications due to aging or cracking; on the other hand, the present invention provides a tool platform having a heat insulating layer or suitable for covering the outside of the high-temperature pipeline in a clean room with a heat insulating layer or so as to reduce the heat loss in the pipeline or the interface of the tool platform, thereby improving the energy-saving and carbon-reducing effects.

In the above-mentioned solvent drying step (6-1), the organic solvent in a fiber cloth or high temperature resistant film/high temperature resistant sheet surface impregnated or coated with adhesive material solution having high heat resistance, high strength and dust-resistant properties is accompanied by vaporization on the surface, so that the adhesive material solution is gradually dried, wherein the solvent drying temperature here is determined with the boiling point of the mixed solvent of the adhesive material solution; in some embodiments, the solvent is ethanol, and the solvent drying temperature is 60~75° C.; in other embodiments, the solvent is methyl ethyl ketone, and the solvent drying temperature is 80~90° C.; in other embodiments, the solvent is water, and the drying temperature of the water solvent is 80~102° C.; based on reducing the hazard of the dried solvent, the solvent is vaporized and recovered through a recovery device to reduce the content of the vaporized solvent in the working environment, thereby reducing the hazard.

In another embodiment, in the solvent drying steps (6-1), the organic solvents of the adhesive material solutions containing or coating in a fiber cloth or high temperature resistant film/high temperature resistant thin plate are accompanied by vaporization so that the adhesive material solution is gradually dry. Therefore, a high temperature resistant fiber cloth or high temperature resistant film/sheet covering aerogel composite material covering aerogel composite material with high heat resistance, high strength and without shedding dust can be obtained.

Further, in the crosslinking curing step (6-2), a high temperature resistant fiber cloth or high temperature resistant film/high temperature resistant sheet impregnated or coated with high temperature resistant adhesive material solution multi-layer covering the aerogel preformed material can make crosslinking curing reaction between the inorganic glue and thermosetting polymer chains or between the inorganic glue, thermosetting molecules and the aerogel molecules at a specific crosslinking curing temperature. The inorganic glue is such as water glass glue, inorganic silicone resin glue and other inorganic glue, and the thermosetting polymer is epoxy resin, wherein the crosslinking curing temperature is about 120~200° C. In some embodiments, the optimal crosslinking curing temperature is 150~180° C. or 185~190° C.; on the other hand, inorganic glue is such as copper oxide-phosphate glue, silicate glue, and phosphoric acid-silicate glue, and thermosetting polymer is polyimide, and the crosslinking curing temperature is a series of crosslinking curing temperatures about 120~325° C. In some embodiments, the highest crosslinking curing temperature is 320-325° C. In the crosslinking curing step (6-2), at a specific crosslinking temperature, the impregnated or coated organic or inorganic adhesive solution is cross-linked between molecules of a high temperature resistant fiber cloth or a high temperature resistant film/sheet so as to form a high temperature resistant fiber cloth or high temperature resistant film/high temperature resistant sheet impregnated or coated with high temperature resistant adhesive material solution multi-layer covering an aerogel forming composite material with high heat insulation, high fire resistance, high strength and no dust shedding.

Further, in surface treatment step (7), utilizing one of polishing, air spraying, and surface spraying of aerogel fireproof and heat insulating coatings or combination thereof to carry out clean and surface protection and other process combinations for the high temperature resistant film covering aerogel composite surface with high strength, low heat transfer, low dielectric and high fireproof will form a high temperature resistant fiber cloth or high temperature resistant film/high temperature resistant sheet multi-layer covering aerogel molding composite material with high strength, low heat transfer, low dielectric and high fireproof.

Further, in the above preparation method, the internal aerogel material of the aerogel forming composite material with low heat transfer and low dielectric multi-layer coating is a porous structure, and its porosity is between 50.0~75.0%; its density is between 0.20~0.60 g/cm$^3$, and its heat transfer coefficient is between 0.020~0.045 W/mk; its dielectric constant is between 1.30~1.85, and its flame resistance is above UL94-5VA level; the highest heat resistant temperature can reach 1200 degrees Celsius. When the hot spot temperature is about 650 degrees Celsius and the product thickness is 2 mm~3 mm, the heat insulation temperature drops to below 200 degrees Celsius.

The present invention provides a high strength, high temperature resistant material covering aerogel composite material that can be rapidly produced. First, the improved sol-gel technology is used to carry out rapid condensation suspension dispersion solution technology with equipment such as an emulsifier or a homogenizer under low organic solvent and low acid-base ion concentration, and then the condensation suspension dispersion solution is impregnated in a preform mold or a fiber-containing preform mold to prepare an aerogel or aerogel/fiber composite structure with a specific molding structure with high heat insulation and low dielectric; further, a fiber cloth or high temperature resistant film/high temperature resistant sheet impregnated or coated with the adhesive material solution is used to cover aerogel composite structural material in single layer or multiple layers, followed by crosslinking and curing and surface treatment to prepare multi-layer covering aerogel composite structural materials with high fireproof, low heat transfer and no dust loss. Related products can be used in various high-tech industrial clean room applications to achieve energy saving and carbon reduction effects, as well as future electric vehicle or hydrogen energy vehicle safety protection applications.

The preparation method provided by the present invention has the following effects:

1. The preparation method provided by the present invention improves the shortcoming that traditional aerogel heat insulation materials are easy to chip, so as to promote the widely used properties of aerogel heat insulation materials. The present invention is to prepare an aerogel composite material with high strength, high fireproof, no dust loss, and high heat insulation properties, wherein the aerogel composite material is made by using improved sol-gel technology, so a large amount of organic solvents, surfactants, and adhesives are not added in the manufacturing process. Therefore, there is no need for long-term solvent replacement and supercritical drying technology, and only the atmospheric pressure drying technology containing solvent recovery is used in the process of preparing aerogel composite materials. The overall manufacturing process is simple, high safety and more economical advantages, and the batch process speed can be reduced to 12 to 48 hours to complete the product, or to prepare aerogel or aerogel/fiber composite materials in a continuous production mode to improve production efficiency.

2. In the preparation method provided by the present invention, factors such as the ratio of siloxane compound and hydrophobic modified siloxane compound, the content of hydrolysis solvent, the content of dispersed aqueous solution, the stirring rate of dispersion equipment such as emulsifier or homogenizer, the content and ratio of acid catalyst and alkali catalyst can be utilized to easily regulate the porosity and pore size of the porous aerogel particles, porosity between the aerogel particles and the compactness of the aerogel structure.

3. In the preparation method provided by the present invention, the hydrophilic-hydrophobic repulsive force and rapid stirring are used to make the siloxane compound and the hydrophobic modified siloxane compound form fine wet gel particles to improve its drying rate and reduce shrinkage properties; therefore, no other hydrophobic organic solvents are added except alcohols, such as cyclohexane, benzene, isopropanol, ammonia and a large amount of surfactants, etc., and the acid catalyst and alkali catalyst are controlled at very low concentrations, which can further regulate the heat conduction of the aerogel material, fireproof properties and their dielectric properties to reduce the manufacturing cost of aerogel composites.

4. In the preparation method provided by the present invention, a rapid condensation dispersion solution technology is provided with an emulsifier or a homogenizer, and a small amount of water-dispersible high temperature resistant adhesive material can also be added in the condensation dispersion aqueous solution, and the condensation dispersion solution is filled in a preformed model or a fiber-containing preformed model, and then gelled to shaping. Further, in the subsequent gelation process, the wet gel particles are aggregated in the preform model or the fiber-containing preformed model to form a network aerogel structure. After further drying, it can be prepared into tube-shaped, plate-shaped of different sizes and aerogel molding structures of specific appearances. Compared with other technologies, the products prepared by this technology not only save a lot of organic solvents, but also have a fast manufacturing process.

5. To solve the problem of aerogel dust scattering, on the one hand, the present invention adds a small amount of water-dispersible high temperature resistant adhesive material in the condensation dispersion aqueous solution to cover the surface of the aerogel structure so as to form an organic-inorganic composite structure. On the other hand, a like-fiber reinforced resin (LFRP) covering technology is provided in which a high temperature resistant organic or inorganic colloid is used to impregnate and coat a high temperature resistant metal, inorganic or organic-inorganic composite film, sheet or high temperature resistant fiber cloth, followed by single-layer to multi-layer covering of the aerogel preformed composite material. After crosslinking and curing under atmospheric pressure and high temperature environment, a fiber-like reinforced resin (LFRP) multi-layer covering aerogel composite material is formed. This technology can be used to prepare aerogel composite materials with high strength, high heat insulation, high fireproof and no dust shedding.

6. Such like-fiber reinforced resin (LFRP) covering aerogel composite material is provided in the preparation method by the present invention, wherein the strength, durable temperature, rigidity, compactness, electrical and thermal conductivity or dielectric properties of the outer layer can be regulated by the resin type and the material of the coating materials. Through the preparation technology provided by the present invention, the like-fiber reinforced resin (LFRP) multi-layer covering aerogel composite has a porosity between 50.0~75.0%, a density between 0.20~0.60 g/cm$^3$, a heat transfer coefficient between 0.020~0.045 W/mk, a dielectric constant between 1.30~1.85, a flame resistance above UL94-5VA level, and its maximum heat resistant temperature can reach 1200 degrees Celsius. When the hot spot temperature is about 850 degrees Celsius and the product thickness is 2 mm~3 mm, the heat insulation temperature drops to below 200 degrees Celsius.

DETAILED DESCRIPTION OF THE INVENTION

Figure 1:
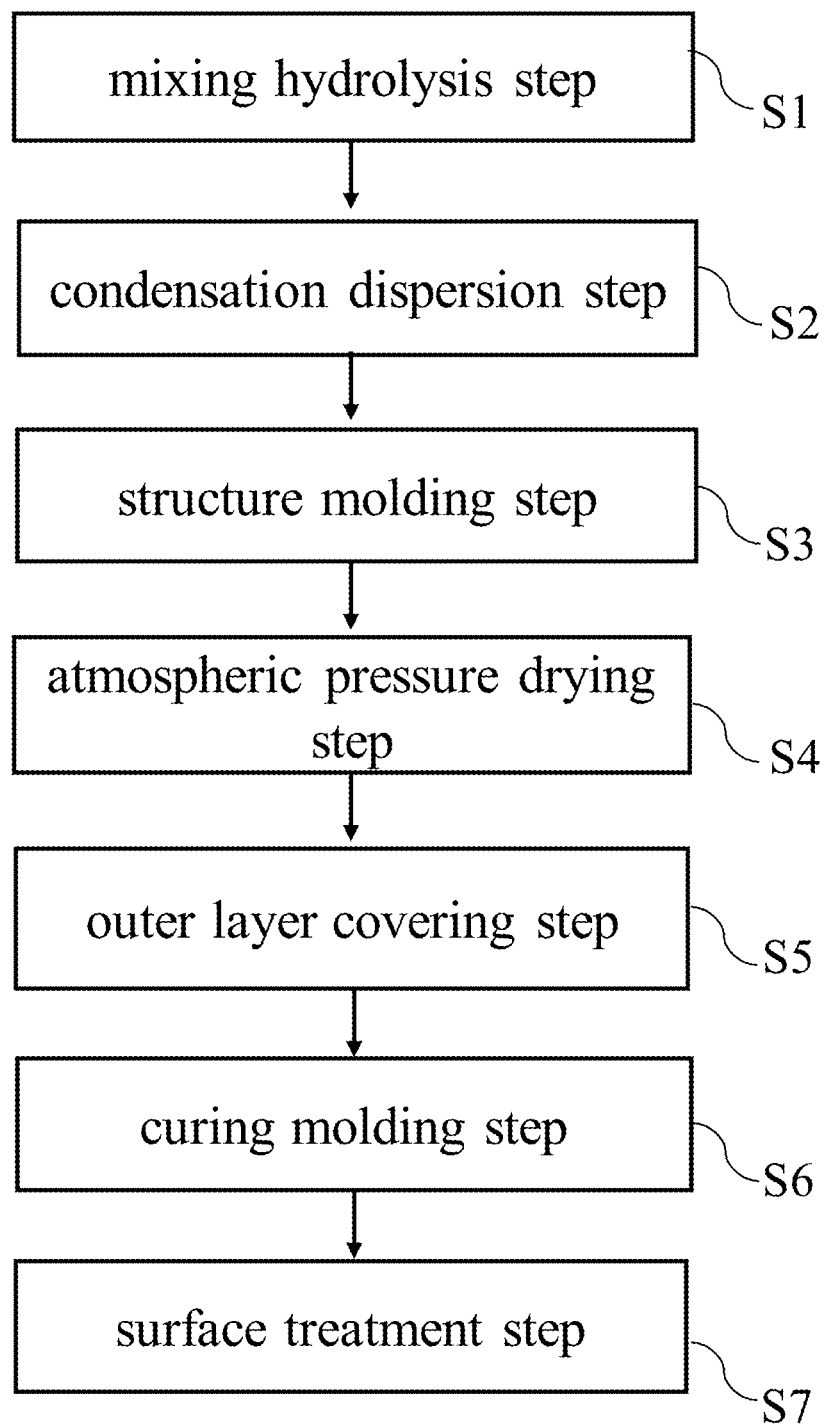
FIG. 1 is a flow chart of the steps of the first embodiment of the present invention, illustrating that the present invention is a high temperature resistant fiber cloth or high temperature resistant film/high temperature resistant sheet coated with high temperature resistant adhesive material, which has high heat insulation, high fire prevention, high strength and does not shed dust, multi-layered covering an aerogel composite material.

Please refer to FIG. 1, the present invention provides a dust-free, high heat insulation, high fireproof aerogel composite material for clean room and electric vehicle safety protection and preparation method thereof, which comprises the following steps: a mixing hydrolysis step (S1), a condensation dispersion step (S2), a structure molding step (S3), an atmospheric pressure drying step (S4), an outer layer covering step (S5), a curing molding step (S6), and a surface treatment step (S7), wherein:

The mixing hydrolysis step: adding a siloxane precursor to an aqueous ethanol solution to form a mixed solution, wherein the siloxane precursor comprises one or a combination of a siloxane compound and a hydrophobic modified siloxane compound, and the hydrophobic modified siloxane compound contains hydrophobic modified siloxane compounds with different chain lengths, and then adding an acid catalyst to the mixed solution to carry out the hydrolysis reaction; in some embodiments, the siloxane compound comprises tetramethoxysilane (TMOS), tetraethoxysilane (TEOS) or a combination thereof; the hydrophobic modified siloxane compound comprises one or a combination of methyltrimethoxysilane (MTMS), propyltrimethoxysilane (PTMS), hexyltrimethoxysilane (HTMS), octyltrimethoxysilane (OTMS), and hexamethyldisilazane (HMDS), which are hydrophobic siloxanes substituted with different alkyl chain lengths. The purpose of adding the hydrophobic modified siloxane is to reduce the cracking of the aerogel structure during the drying process, and the purpose of adding the siloxane is to regulate the internal microstructure of the aerogel structure to increase the content of holes in the structure. In some embodiments, in terms of the overall mixed solution, the molar percentage of the total content of the siloxane compound and the hydrophobic modified siloxane is between 0.5 mol % and 40 mol %, and the molar percentage of the ethanol aqueous solution is between 99.5 mol % and 60 mol %.

In the present embodiment, the molar ratio of the siloxane compound and the hydrophobic modified siloxane compound is from 0:100 to 95:5; in a preferred embodiment, the molar ratio of the siloxane compound and the hydrophobic modified siloxane compound is 5:95; in another preferred embodiment, the molar ratio of the silicone compound and the hydrophobic modified silicone compound is between 0:100 mol % and 40:60 mol %; in the aqueous ethanol solution, the molar ratio of ethanol and water is from 0:100 to 50:50; in a preferred embodiment, the molar ratio of ethanol and water is 15:85.

In the mixing hydrolysis step (S1), the siloxane compound or the hydrophobic modified siloxane compound is fully mixed with a large amount of ethanol aqueous solution containing a small amount of acid catalyst, and the hydrolysis reaction is carried out simultaneously, wherein the solvent of the acid catalyst ethanol aqueous solution includes ethanol, deionized water, treated water, secondary treated water, etc. or a mixture of different compositions, and the molar ratio of the total content of the mixture of the siloxane and the hydrophobic modified siloxane and the content of the acid catalyst is from 1:0.01 to 1:0.00005. When the content ratio of the acid catalyst in the mixed solution of the siloxane and the hydrophobic modified siloxane is higher, the hydrolysis rate is faster; in other words, the higher the content ratio of the acid catalyst will induce the greater the ion content in the overall aerogel structure and the greater the dielectric loss of the aerogel; in a preferred embodiment, the molar ratio of the total content of siloxane and hydrophobic modified siloxane and the content of the acid catalyst is 1:0.00014.

The condensation dispersion step (S2): adding a dispersion solution to the mixed solution, wherein the dispersion solution includes an alkali catalyst, and utilizing fast stirring equipment such as an emulsifier or a homogenizer to carry out condensation reaction with high-speed stirring to form a dispersion sol solution; it should be further explained that in the condensation reaction, the condensation reaction temperature, the content of the added deionized water and the stirring rate can be controlled so as to adjust the rate of the condensation reaction for obtaining the controlled aerogel microstructure in the dispersed sol solution. The volume ratio of the dispersed aqueous solution to the ethanol aqueous solution is from 75:25 to 30:70; in a preferred embodiment, the volume ratio of the dispersed aqueous solution to the ethanol aqueous solution is 50:50.

In the condensation dispersion step, the increase in temperature helps to shorten the condensation reaction time significantly, that is, the gelation time of the aerogel is effectively shortened in the dispersion condensation step (S2); when the content equivalent number ratio of the alkali catalyst and acid catalyst is 1.0:1.0, the condensation reaction temperature is 20~55° C., and the condensation reaction time is 20~250 minutes; in some preferred embodiments, the condensation reaction temperature is 25° C., and the condensation reaction time is about 220 minutes; when the condensation reaction temperature is 50° C., the condensation reaction time is about 15 minutes.

In the condensation dispersion step, when the hydrolyzed siloxane molecule and the hydrophobic siloxane molecule mixture form nanometer to submicron hydrolyzed wet gel particles in the suspension dispersion solution, adding a high temperature resistant adhesive material dispersed by adding a small amount of water can be used in this suspension dispersion solution, so that the subsequent gelation process allows the nanometer to submicron aerogel wet glue to condense and aggregate to form a network structure. The high temperature resistant adhesive material of the small amount of water dispersible can be coated on the surface of the aerogel three-dimensional network structure to form an organic-inorganic composite nanostructure material, wherein the volume ratio of the high temperature resistant adhesive material that can be dispersed by adding a small amount of water to the dispersion aqueous solution is between 0.01% and 5%, and the high temperature resistant adhesive material can withstand high temperatures above 300° C.

In some other embodiments, the increase of alkali catalyst content also significantly shortens the condensation reaction time, wherein the content equivalent number ratio of 1.0M alkali catalyst and 1.0M acid catalyst is 0.8:1.0~2.0:1.0, and the condensation reaction time is from 360 minutes to about 3 minutes; in some embodiments, the content equivalent ratio is 0.8:1.0, and the condensation reaction time is 360 minutes; in other preferred embodiments, the content equivalent ratio is 1.6:1.0, and the condensation reaction time is about 10 minutes; it should be further explained that when the content equivalent ratio is less than 1.0:1.0, the condensation reaction time will gradually increase, and the dielectric loss of the prepared aerogel will decrease significantly; when the content equivalence ratio is greater than 1.0:1.0, the condensation reaction time decreases gradually, but the dielectric loss of the prepared aerogel will obviously increase due to the increase of ion content; in one of the preferred embodiments of this embodiment, the content volume ratio is 1.2:1.0.

The structural molding step (S3): injecting the suspension dispersion sol solution into a preformed model to impel the suspension dispersion sol solution containing a trace amount of high temperature resistant adhesive material to further condense in the preformed mold to form a like-solid aerogel wet glue preformed structure; in this molding step, the siloxane aerogel molecules are aggregated through condensation reaction to form siloxane aerogel molecular aggregates, and the initial structure size of the siloxane aerogel molecules can be controlled at 5~10 nm. The initial structure is stacked again to form aerogel wet glue molecules of about 50~100 nm, and the 50~100 nm aerogel wet glue molecules are further stacked to form larger aggregates, which are connected to each other to form a three-dimensional network structure, so as to form a stable organic-inorganic composite gel structure material of a high temperature resistant adhesive material containing a large amount of solvents covering the surface of an aerogel three-dimensional network structure.

In other embodiments, the suspension dispersion sol solution containing a small amount of high temperature resistant adhesive material is injected into a preformed model containing a large amount of fibers; under this condition, the siloxane aerogel molecules are adsorbed on the surface of the fibers and condensed and stacked into 50~100 nm aerogel wet glue molecules on the surface of the fiber. The 50~100 nm aerogel wet glue molecules are further stacked between fibers and fiber structures to form a three-dimensional aerogel network structure, and then form a stable organic-inorganic composite gel structure material of a high temperature resistant adhesive material containing a large amount of fibers covering the surface of an aerogel three-dimensional network structure. In this molding step, the molecular-level aerogel solution can be compositely processed on the fiber material by using technologies such as impregnation, pressure suction, spraying, perfusion or vacuum adsorption. Thus, the preform system may comprise a shaping mold or a shaping mold containing fibrous materials.

In some embodiments, the fiber material comprises one or a combination of porous loose cotton, mat, paper, blanket, rope or thick board, which is prepared by metal fibers, inorganic fibers, liquid crystal fibers, organic fibers, specifically, various types of metal fibers or metal rods with micron to nanometer scale, glass fibers, carbon fibers, quartz fibers, ceramic fibers, rock wool fibers, Kevlar polyamide fibers, Nomex polyamide fibers, nylon fibers, polyester fibers, various types of cellulose, biodegradable inorganic fibers and biodegradable organic fibers, etc.

The atmospheric pressure drying step (S4): under atmospheric pressure, at a molding drying temperature, the like-solid aerogel wet glue structure is dried at a high temperature under the atmospheric pressure condition, so as to obtain a uniform structure with low heat aerogel preformed composite material, which comprises an aerogel sheet or an aerogel/fiber composite sheet; in some embodiments, the drying temperature is between 60° C. and 150° C.

Further, the drying step includes a solvent vaporization step (S4-1), a solvent recovery step (S4-2) and a solvent bump step (S4-3).

The vaporization step (S4-1): placing the like-solid preformed aerogel wet glue system at an atmospheric pressure and the azeotropic vaporization temperature of the mixed solvent, and using the temperature to allow a large amount of water molecules containing alcohol to rapidly azeotropically vaporize so as to make alcohol water molecules in the aerogel wet glue system azeotropically distil to dry; in some embodiments, the azeotropic temperature of the solvent is 60~90° C.

The solvent recovery step (S4-2): under the azeotropic vaporization temperature environment, a large amount of alcohol-containing aqueous solution in the preformed structure is rapidly azeotropically vaporized, and the vaporized steam is guided to a heat exchange recovery device; the heat exchange recovery equipment promotes the condensation and recovery of aqueous alcohol; in some embodiments of the present invention, the condensed aqueous alcohol is an additional recovery product of this process; the purpose of this recovery is to recover valuable alcohol by-products on the one hand to reduce manufacturing costs; on the other hand, recovering vapor containing alcohol can reduce environmental and air pollution.

The bumping step (S4-3): adjusting the ambient temperature of the vaporized preformed aerogel containing a trace amount of solvent to the solvent bumping temperature, so that the trace amount of solvent contained inside produces a rapid vaporization bumping phenomenon; in some embodiments, the bumping temperature is 110~150° C.; it should be further explained that, under the high temperature environment created by the bumping temperature, the bumping phenomenon generated by the trace amount of alcohol water molecules inside the aerogel promotes the generation of a positive vapor pressure inside the aerogel, and the positive vapor pressure can inhibit the shrinkage or collapse of the aerogel structure during the drying process; on the other hand, the positive pressure makes the aerogel network structure expand to produce a large number of micro-thin pores and be porous so as to obtain the aerogel preformed material; therefore, the preparation method can be used to prepare low-density and high-porosity aerogel or aerogel/fiber composite materials, which have its thermal conductivity k about 0.013~0.018 W/mk; the thermal conductivity k of the aerogel/fiber composite material is about 0.022~0.032 W/mk, and its flame resistance is in UL94-V0 grade or above.

In addition, since a large amount of organic solvents and surfactants such as alkanes, aromatic benzenes, and amines are not added, the drying process is relatively safe and aerogel products with higher purity can be prepared. Because the prepared high porosity aerogel sheet or aerogel/fiber composite sheet does not contain various impurities, the thermal conductivity, dielectric constant and dielectric loss of the product will be more excellent.

The outer covering step (S5): preparing a high temperature resistant adhesive material solution above 300° C., and impregnating and covering the high temperature resistant adhesive material solution on the surface of a high temperature resistant material above 300° C., so that the high temperature adhesive material solution evenly penetrates into the inside of the high temperature resistant materials, such as the inside of high temperature resistant fiber cloth. Then, the high temperature resistant material impregnated with the high temperature resistant adhesive material solution is further used for single-layer or multi-layer covering of the aerogel preformed composite material, wherein the high temperature resistant material includes one or a combination of non-organic film, non-organic sheet, or high temperature resistant fiber, such as a high temperature resistant film, and the high temperature resistant adhesive material solution can be a high temperature resistant inorganic adhesive material or a thermosetting resin solution, wherein the high temperature resistant adhesive material in the high temperature resistant adhesive material solution can withstand high temperatures above 300° C., while other high temperature resistant materials, high temperature resistant films and high temperature resistant fibers can also achieve high temperature resistance above 300° C. Specifically, the high temperature resistant adhesive material solution includes one or a combination of inorganic glue, thermoplastic or thermosetting resin, and the inorganic glue includes, for example, one or a combination of water glass glue, inorganic silicone resin glue, copper oxide-phosphate glue, silicate glue, phosphoric acid-silicate glue, sulfate glue, magnesium oxide-silica-borax inorganic glue, the thermosetting resin includes epoxy resin, polyimide resin, polyether imide resin, polyphenylene ether resin, polyphenylene ether resin sulfide resin, polyetherketone liquid crystal polymer resin, polytetrafluoroethylene resin, polymelamine resin, polyphenolic resin, polymelamine-formaldehyde resin, polyester glue, polyamide glue, polyamide ester glue, silicone glue, etc. In terms of the covering step of the fiber cloth impregnated with the adhesive material, the concentration of the adhesive material solution is between 10 and 75.0 wt %, wherein the lower the concentration of the adhesive material solution will induce the better the efficiency of the adhesive material solution infiltrating into the fiber cloth and the easier to process, but induce the lower the compactness of the aerogel molding composite material covered with multi-layer fiber cloth impregnated with the adhesive material solution, and the higher the hole content in the structure, so the aerogel dust leakage is easier to occur; relatively, the higher the concentration of the adhesive solution will induce the higher the content of the adhesive solution coated on the surface of the fiber cloth, and the higher the strength and the denser the prepared aerogel molding composite material coated with multi-layer fiber cloths impregnated with the adhesive solution. It is less likely to produce aerogel dust leakage, but the processing is more difficult, and the film thickness is less easy to control. Therefore, the concentration of the impregnated adhesive material solution can be used to control the properties of molding processing and preventing dust from falling of multiple layers of fiber cloth impregnated with the high temperature resistant adhesive material solution covering the aerogel molding composite material. The optimum adhesive material solution concentration is between 30-50.0 wt %.

In the outer covering step (S5), one of the high temperature resistant non-organic film, high temperature resistant non-organic sheet or high temperature resistant fiber or a combination thereof, wherein the high temperature resistant non-organic film and high temperature resistant non-organic sheet comprise metal, inorganic and organic-inorganic composite and other high temperature resistant films and sheets covering the aerogel with one single layer, multiple layers or a laminate stack for multi-layer lamination. It is worth mentioning that multiple layers covering refers to the multi-layer stack covering of the same high temperature resistant film, while multi-layer lamination stack covering refers to the multi-layer stack covering of various high temperature resistant films. In other words, the present invention does not limit that the types of high temperature resistant films used to cover the aerogel preformed composite materials are metal film and/or sheet, inorganic film and/or sheet, or organic-inorganic composite high temperature resistant film and/or sheet, and single-layer or multi-layer. Further, the metal film and/or sheet comprises a thin film made of metal materials such as aluminum, stainless steel, copper, or a combination thereof; inorganic film and/or sheet comprises mica sheet, graphite sheet, graphene sheet, glass sheet and various ceramic sheet, films, sheets or a combination thereof prepared by metal oxides, metal nitrogen silicon compounds and metal carbon silicon compounds; organic-inorganic composite films include aluminum, stainless steel, copper, mica sheet, graphite sheet, graphene sheet, glass sheet and ceramics, etc., and metal, metal oxide, metal nitrogen silicon compound and metal carbon silicon compound particles combined with various organic glues or various inorganic glues to manufacture high temperature resistant organic-inorganic composite films, sheets or inorganic-inorganic composite films, sheets, or a combination thereof, etc. Furthermore, the high temperature resistant fibers above 300 degrees include one or a combination of various porous loose cotton, mat, paper, blanket, rope, thick board prepared by quartz fibers, glass fibers, ceramic fibers, carbon fibers, organic fibers, such as nylon fibers, polyester fibers, polyfluorine fibers, liquid crystal fibers, such as Kevlar polyamide fibers, Nomex polyamide fibers, various types of cellulose, biodegradable inorganic or organic fibers, etc.

The curing molding step (S6): the high temperature resistant materials such as a fiber cloth impregnated with a high temperature adhesive material solution above 300 degrees with single layer or multilayers of the high temperature resistant film covering the aerogel preformed composite material are placed at the boiling point temperature of the solvent drying of the impregnated high temperature resistant adhesive material solution so as to make the solvent of the adhesive solution vaporize to reduce the formation of molding defects or bubble holes and the adhesive material solution be gradually dried. Here, the solvent drying temperature varies with depending on the boiling point of the mixing solvent of the adhesive material solution; in some embodiments, the mixed solvent is ethanol, and the solvent drying temperature is 60~75° C.; in other embodiments, the mixed solvent is butanone, and the solvent drying temperature is 80-90° C.; in other embodiments, the solvent is water, and the drying temperature of the water solvent is 80~102° C.; Therefore, the drying temperature of the solvent in the embodiment can be between 60~115° C. After drying, the fiber cloth impregnated with the adhesive material solution will not have holes due to the large number of air bubbles generated by the higher drying temperature, which will cause subsequent spillage of aerogel dust in applications. Then, a higher curing molding temperature is used to carry out the curing molding step of impregnating the high temperature resistant adhesive material solution, wherein the curing molding temperature is higher than the solvent drying temperature so as to obtain a high temperature resistant film covering aerogel preformed composite material with high strength, low heat transfer, low dielectric and high fireproof.

In another embodiment, in the solvent drying step, the organic solvent inside the fiber cloth impregnated with the adhesive material solution is vaporized, for example, such as a composite material of the high temperature resistant material covering the aerogel preformed material formed by covering the aerogel preformed material with the non-organic film, the non-organic sheet, or the high temperature resistant fiber above 300° C., impregnated with the high temperature resistant adhesive material solution, and the solvent is vaporized at the solvent drying temperature of the high temperature resistant adhesive material. If it is a room temperature curing resin adhesive material, the fiber cloth impregnated with the adhesive material solution will be solidified during the solvent vaporization process so as to obtain a dust-free, high insulation aerogel composite material for high strength clean room and electric vehicle safety protection. In other words, in addition to solvent drying, this step also includes adhesive material resin curing, so this step can also be called a normal temperature drying and curing step.

In the curing molding step (S6), a high temperature resistant fiber cloth or high temperature resistant film/high temperature resistant sheet impregnated or coated with high temperature resistant adhesive material solution multi-layer covering the aerogel preformed material can make cross-linking curing reaction between the inorganic glue and thermosetting polymer chains or between the inorganic glue, thermosetting molecules and the aerogel molecules at a specific crosslinking curing temperature. The inorganic glue is such as water glass glue, inorganic silicone resin glue and other inorganic glue, and the thermosetting polymer is epoxy resin, wherein the crosslinking curing temperature is about 120~200° C. In some embodiments, the optimal crosslinking curing temperature is 150~180° C. or 185~190° C.; on the other hand, inorganic glue is such as copper oxide-phosphate glue, silicate glue, and phosphoric acid-silicate glue, and thermosetting polymer is polyimide, and the crosslinking curing temperature is a series of crosslinking curing temperatures about 120~325° C. In some embodiments, the highest crosslinking curing temperature is 320-325° C. In the cross-linking and curing step (S6), at a specific crosslinking temperature, the impregnated or coated organic or inorganic adhesive solution is cross-linked between molecules of a high temperature resistant fiber cloth or a high temperature resistant film/sheet, so as to form a high temperature resistant fiber cloth or high temperature resistant film/high temperature resistant sheet impregnated or coated with high temperature resistant adhesive material solution multi-layer covering an aerogel forming composite material with high heat insulation, high fire resistance, high strength and no dust shedding.

Figure 2:
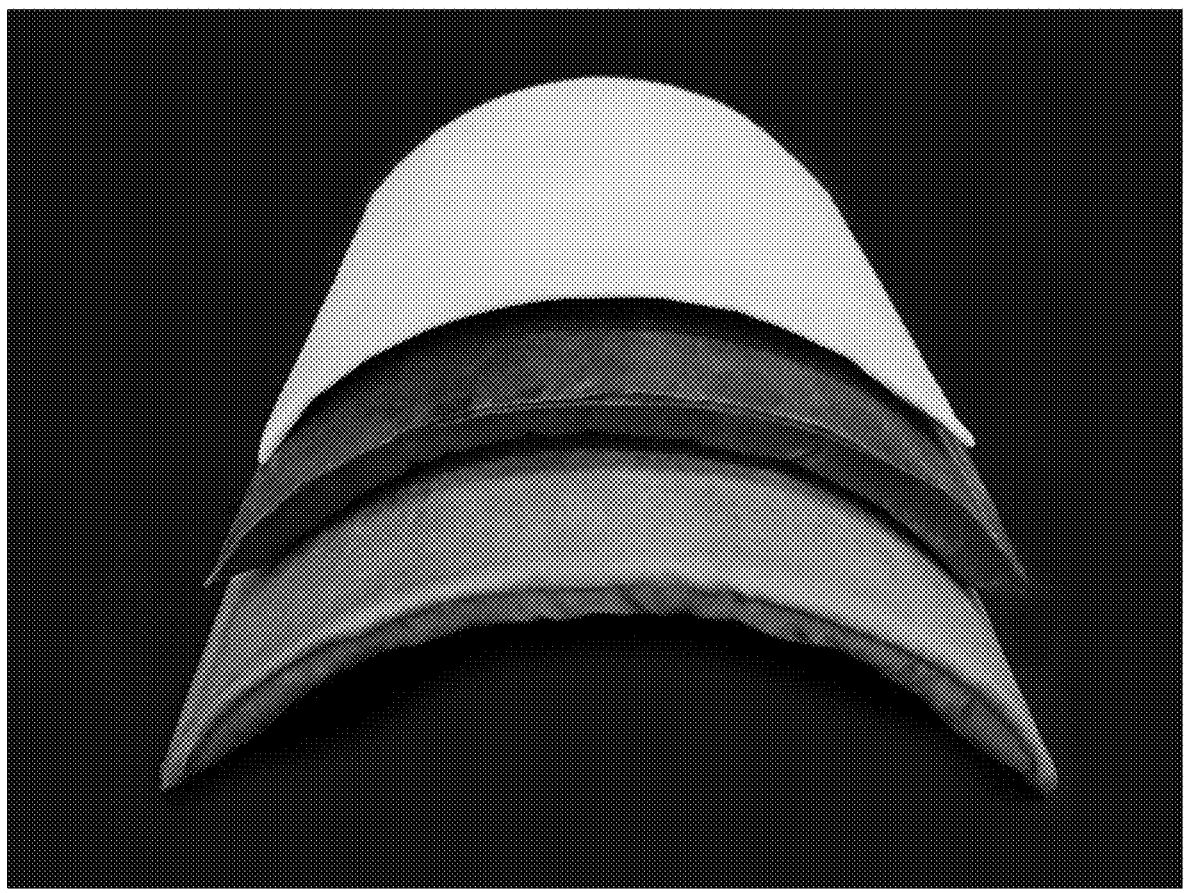
FIG. 2 is a photograph of the appearance of a tubular like-fiber reinforced resin (LFRP) covering aerogel composite material that has high strength, high fireproof, high heat insulation properties and does not shed dust prepared according to the preparation method of the first embodiment of the present invention, wherein the first embodiment is to use three different high temperature resistant adhesive materials glass fibers to cover the aerogel so as to provide a covering shell of a like-fiber reinforced resin (LFRP) with high strength, high hardness and high temperature resistant, which an aerogel material with low thermal conductivity, low dielectric and less powder shedding is inside.

Please refer to FIG. 2, which is an appearance photo of a tubular like-fiber reinforced resin (LFRP) covering aerogel composite material with high strength, high fireproof, high heat insulation properties and no dust loss prepared by the aforementioned preparation method of the first embodiment. From top to bottom in FIG. 2, there are three different high temperature resistant adhesive materials tubular multi-layer covering and cross-linking aerogel composite materials with high strength, high fireproof, high heat insulation properties and no dust shedding. The figure shows that the top is a tubular aerogel composite material covered with white silicone series glass fiber reinforced resin; in contrast, the middle is the tubular aerogel composite material covered with dark polyimide series glass fiber reinforced resin; the bottom is the tubular aerogel composite material covered with light yellow epoxy resin series glass fiber reinforced resin.

Figure 3:
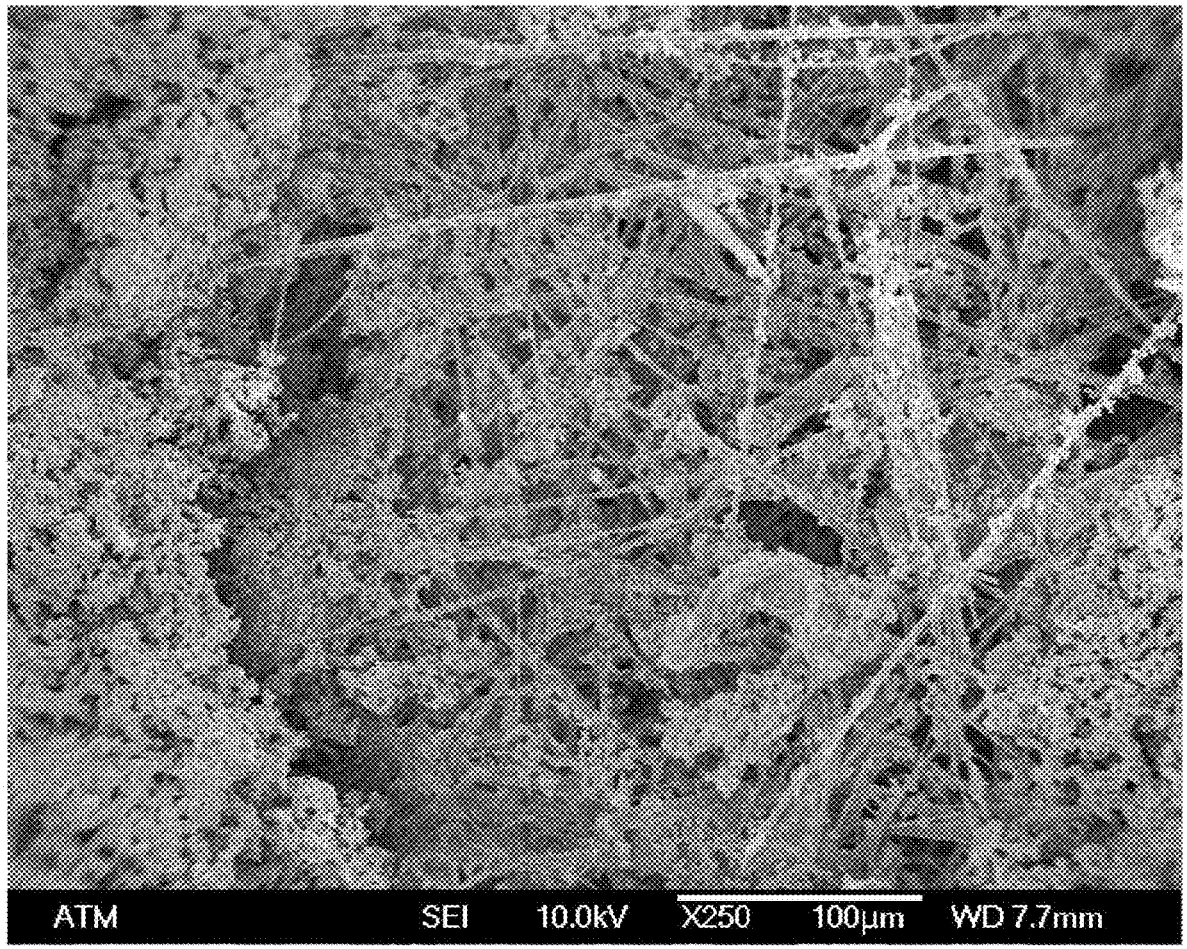
FIG. 3 is an observation photo of a scanning electron microscope (SEM) of a cross-section of a like-fiber reinforced resin covering aerogel composite material having a pure aerogel with low thermal conductivity inside that has high strength, high fireproof, high heat insulation properties and does not shed dust prepared by the preparation method of the first embodiment of the present invention, and the magnification is 300 times.

Please refer to FIG. 3, which is a photo of scanning electron microscope (SEM) for the internal cross-section of like-fiber reinforced resin covering aerogel composite materials with high strength, high fireproof, high heat insulation properties and without shedding dust prepared by the aforementioned preparation method of the first embodiment, and the magnification is 300 times; under electron microscope observation, its microstructure presents an obvious aerogel/fiber composite material, which has a three-dimensional network agglomeration of spherical aerogels with a size ranging from submicron to micron between a large number of fibers; in addition, it can be seen from FIG. 3 that in addition to the aerogel agglomerated structure, the aerogel material with low heat transfer also has a small amount of high temperature resistant adhesive material coated between several micron to sub-micron aerogel particles, and the pore structure formed by a large number of micro-holes connected in series between the fibers and the aerogel particles endows it with low thermal conductivity.

Figure 4:
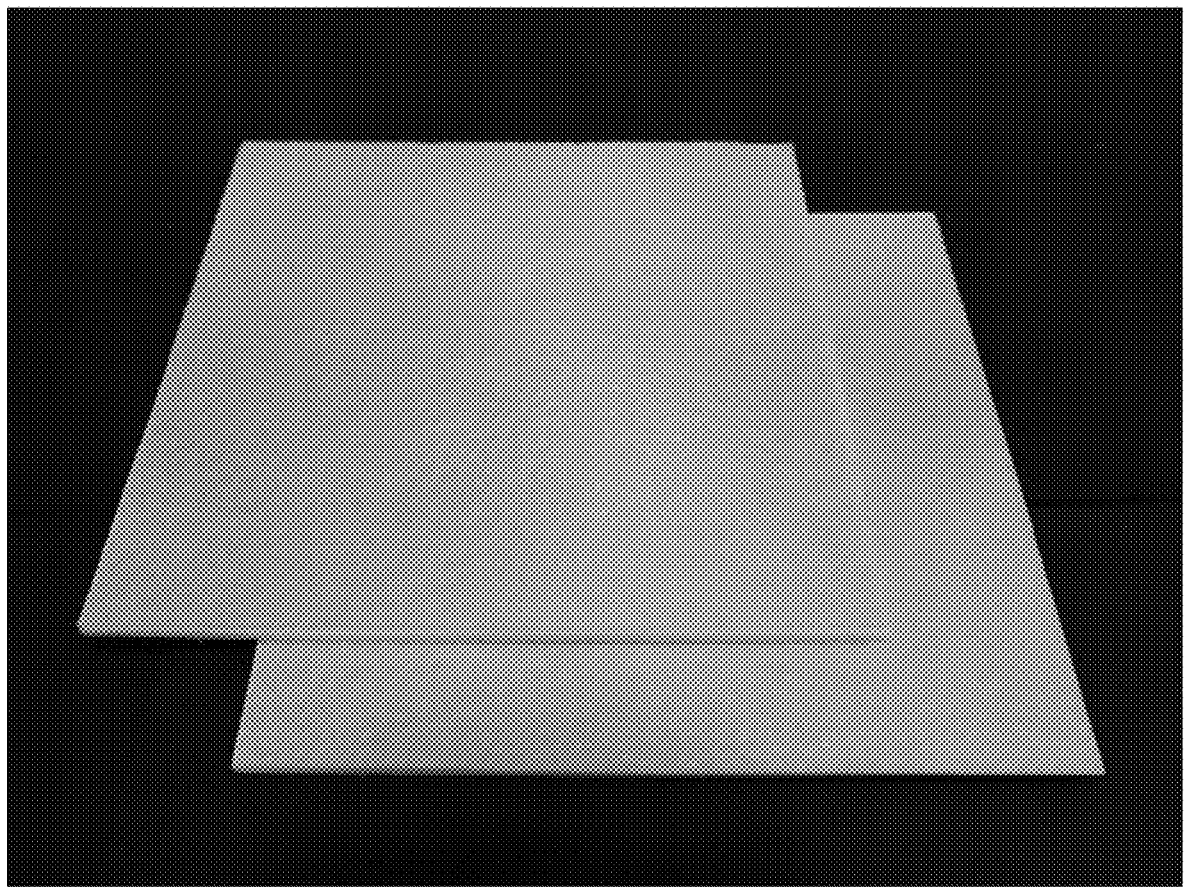
FIG. 4 is an appearance photo of a like-fiber reinforced resin covering aerogel composite material prepared in the second embodiment of the present invention, which has high strength, high fireproof, high heat insulation properties and does not shed dust, wherein the second embodiment is that the upper and lower layers are both mica sheets coated with high temperature resistant inorganic glue covering the aerogel composite material so as to provide a mica reinforced resin covering layer with much higher temperature resistant, high strength and high heat insulating, which a low thermal conductivity aerogel/fiber composite material is inside.

Please refer to FIG. 4, which is an appearance photo of the like-fiber reinforced resin covering aerogel composite material prepared by the aforementioned preparation method of the second embodiment, which has high strength, high fireproof, high heat insulation properties and does not shed dust. In the second embodiment, the upper and lower layers are mica sheets covered with high temperature resistant inorganic glue strengthened covering aerogel composite material so as to provide a mica reinforced resin covering layer with much higher temperature resistant, high strength and high insulation. The interior of this shell structure is a aerogel/fiber composite material with low thermal conductivity coefficient. The above structure can also be multi-layered and stacked to strengthen the application field of aerogel.

Figure 5:
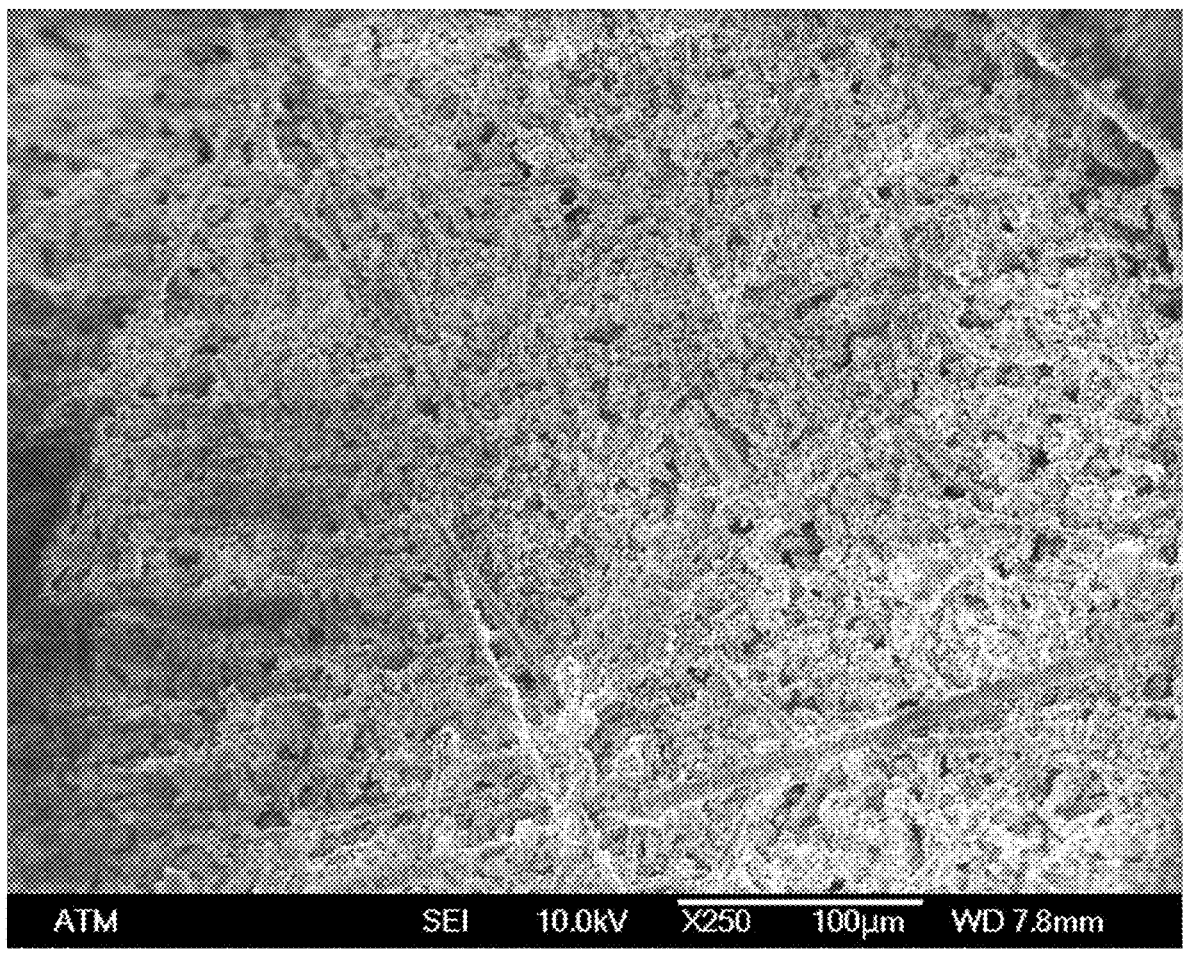
FIG. 5 is an observation photo of a scanning electron microscope (SEM) of a cross-section of a like-fiber reinforced resin covering aerogel composite material in the second embodiment of the present invention, which has high strength, high fireproof, high heat insulation properties and does not shed dust, and the magnification is 250 times.

Please refer to FIG. 5, which is a photo of scanning electron microscope (SEM) for the internal cross-section of like-fiber reinforced resin covering aerogel composite materials with high strength, high fireproof, high heat insulation properties and without shedding dust in the second embodiment, and the magnification is 250 times; FIG. 5 shows that the interior of the aerogel composite material in this embodiment is an aerogel/fiber composite material. This product is composed of a large number of sub-micron aerogel molecules adsorbed on the surface of the fiber and the holes between the fibers are aggregated into a three-dimensional aerogel network structure. In the overall aggregate structure, a large number of holes still be contained and provide the low heat transfer characteristics of the aerogel/fiber composite blanket, and a large number of fibers enhance the appropriate strength of the aerogel/fiber composite board and other properties.

The surface treatment step: utilizing one of polishing, air spraying, and surface spraying of aerogel fireproof and heat insulating coatings or combination thereof to carry out clean and surface protection and other process combinations for the high temperature resistant film covering aerogel composite surface with high strength, low heat transfer, low dielectric and high fireproof will form a high temperature resistant fiber cloth or high temperature resistant film/high temperature resistant sheet multi-layer covering aerogel molding composite material with high strength, low heat transfer, low dielectric and high fireproof.

Figure 6:
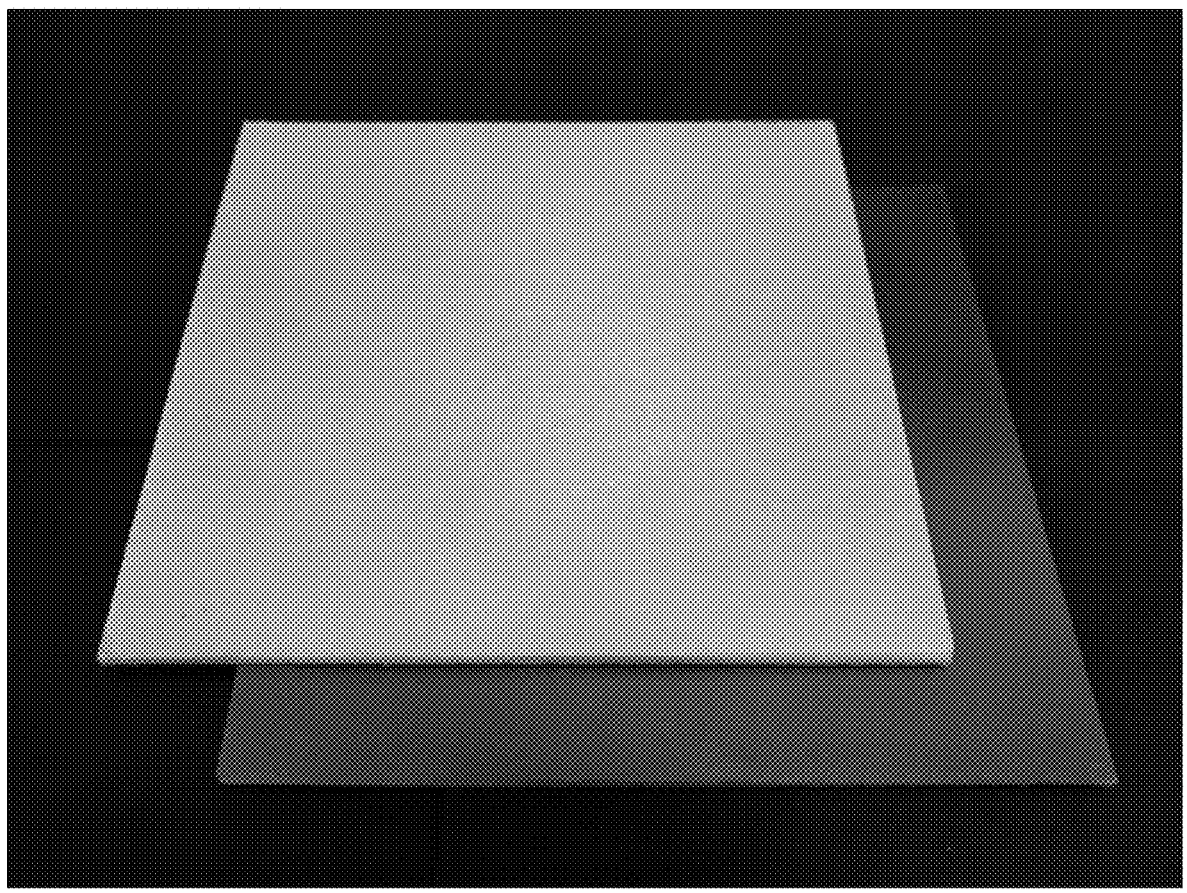
FIG. 6 is an appearance photo of a like-fiber reinforced resin covering aerogel composite material that has high strength, high fireproof, high heat insulation properties and does not shed dust prepared by the preparation method of the third embodiment of the present invention, wherein the upper and lower layers are mica sheet covering layers coated with high temperature resistant inorganic glue in the third embodiment, and then a graphene heat conducting sheet is attached to the outer layer of the mica sheets coated with high temperature resistant inorganic glue so as to provide the material with a thermal diffusion function to enhance the thermal conductivity of the covered aerogel composite material.

Please refer to FIG. 6, which is an appearance photo of the like-fiber reinforced resin covering aerogel composite material prepared by the aforementioned preparation method of the third embodiment, which has high strength, high fireproof, high heat insulation properties and does not shed dust. In the third embodiment, the upper and lower layers are mica sheet covering layers covered with high temperature resistant inorganic glue, and then the graphene heat conducting sheet is bonded to the outer layer of high temperature resistant inorganic glue covering mica sheets to provide this material with a thermal diffusion function. The purpose of the third embodiment is to provide a much higher temperature resistant, high strength and high thermal insulation mica reinforced resin covering layer on the one hand; on the other hand, the purpose is to provide a high temperature resistant, high strength and high thermal conductivity (high electrical conductivity) graphene sheet reinforced resin cladding layer. The above cladding structure can also be made of a high temperature resistant mica sheet on one side and a high temperature resistant graphene heat conducting sheet on the other side or a multi-layer stacked structure to strengthen the application field of aerogel.

Figure 7:
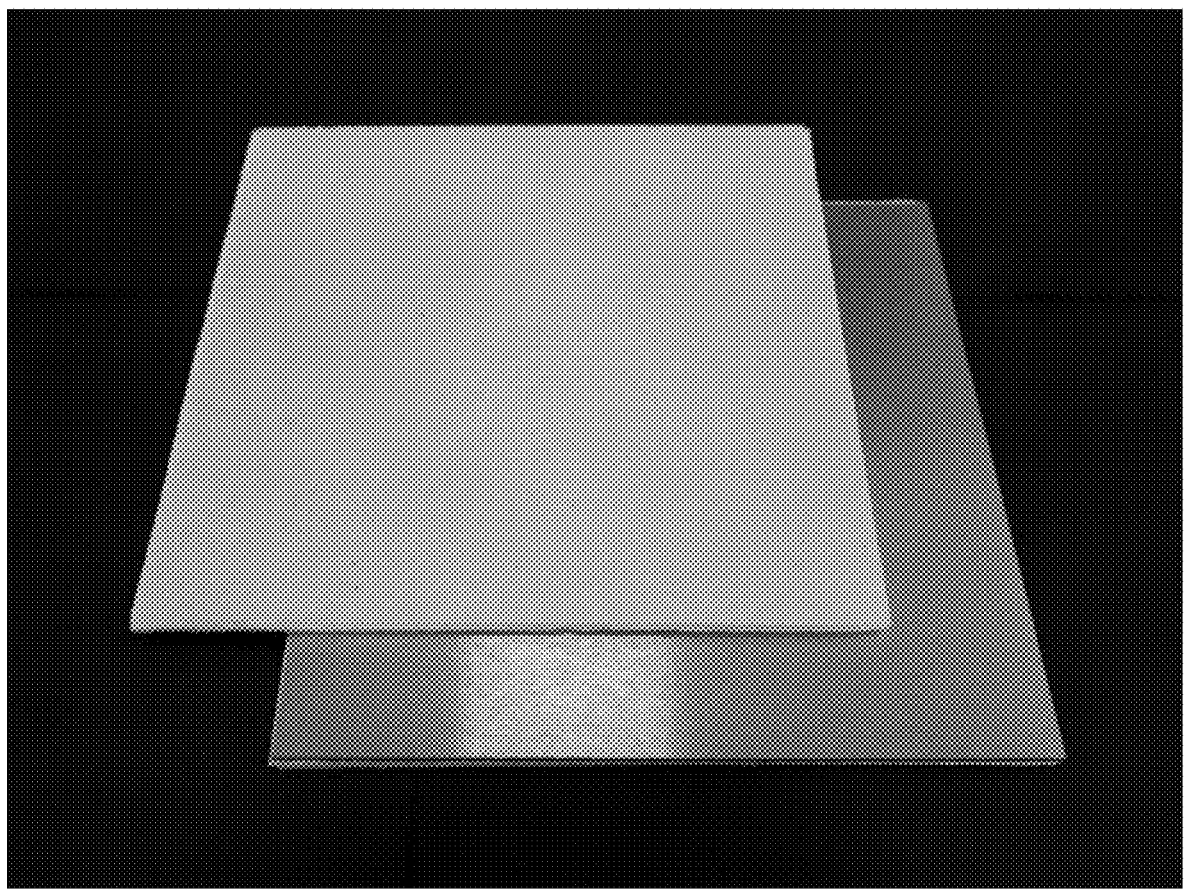
FIG. 7 is an appearance photo of a like-fiber reinforced resin covering aerogel composite material that has high strength, high fireproof, high heat insulation properties and does not shed dust prepared by the preparation method of the fourth embodiment of the present invention, wherein the upper and lower layers are mica sheet covering layers coated with high temperature resistant inorganic glue in the fourth embodiment, and then heat conducting metal foil film is pasted to the mica sheets after the aerogel composites are reinforced and covered with the high temperature resistant mica sheets, so as to provide the material with a heat diffusing function to enhance the heat conducting performance of the covered aerogel composite material.

Please refer to FIG. 7, which is an appearance photo of the like-fiber reinforced resin covering aerogel composite material prepared by the aforementioned preparation method of the fourth embodiment, which has high strength, high fireproof, high heat insulation properties and does not shed dust. In the fourth embodiment, the upper and lower layers are covering layers of mica sheets covered with high temperature resistant inorganic glue, and then the metal film heat conducting sheet is bonded to the outer layer of high temperature resistant inorganic glue covering mica sheets to provide this material with thermal diffusion and high conductive function. The purpose of the fourth embodiment is to provide a high temperature resistant, high strength and high heat insulation mica reinforced resin covering layer on the one hand; on the other hand, the purpose is to provide a high temperature resistant, high strength and high thermal conductivity (high conductivity) metal film reinforced resin covering layer. The above structure can also be made of a high temperature resistant mica sheet on one side and a high temperature resistant metal heat conducting sheet on the other side or a multi-layer stacked structure to strengthen the application field of aerogel.

Figure 8:
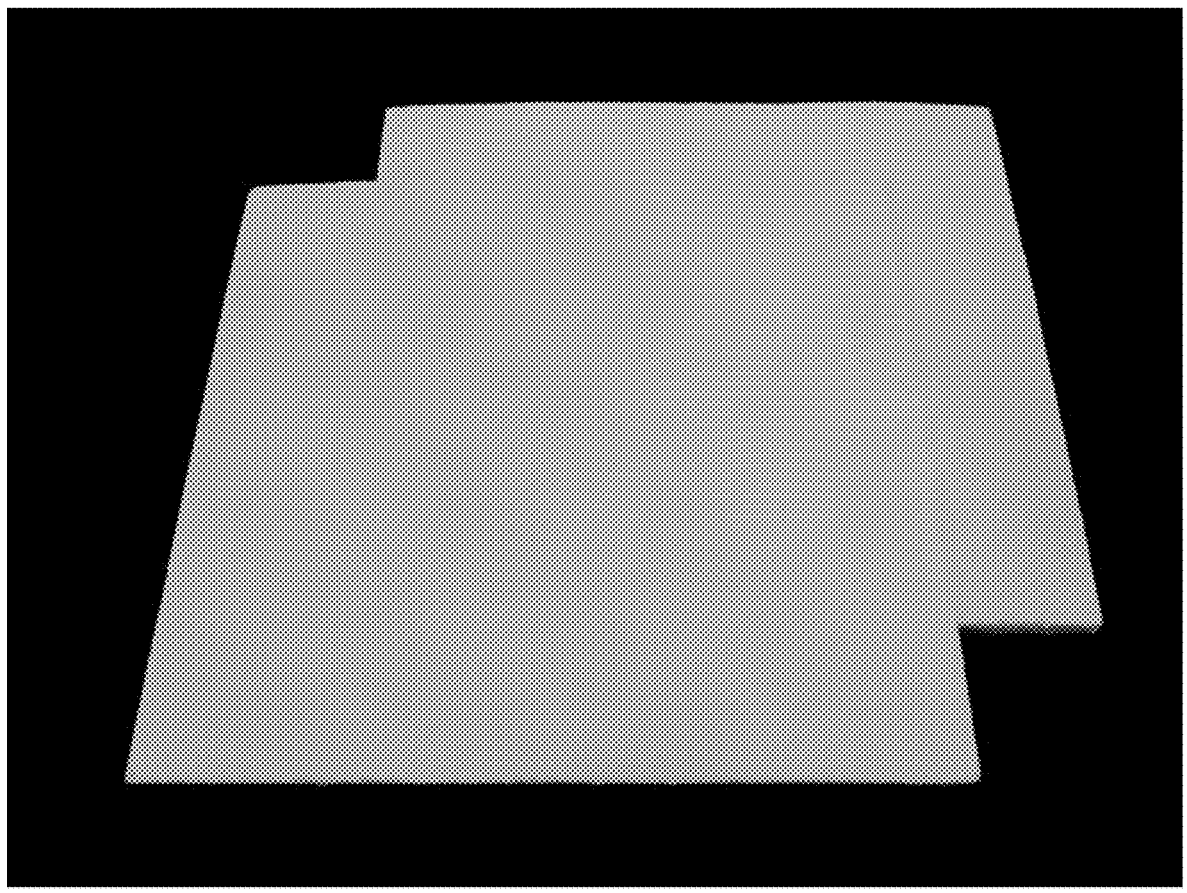
FIG. 8 is an appearance photo of a like-fiber reinforced resin covering aerogel composite material with high strength, high fireproof, and high heat insulation properties prepared in the second to fourth embodiments of the present invention, and then an aerogel fireproof and heat-insulating coating is sprayed on the surface, wherein the surface is sprayed with the aerogel fireproof and heat insulating coating to provide the material with more excellent fireproof and heat insulating properties in the fifth embodiment.

Referring to FIG. 8, the fifth embodiment is an appearance photo of a like-fiber reinforced resin covering aerogel composite material with high strength, high fireproof, and high heat insulation properties prepared by the second to fourth embodiments above and then sprayed with the aerogel fireproof and heat insulation coating on the surface. In the fifth embodiment, the surface is sprayed with an aerogel fireproof and heat insulating coating so as to provide the material with better fireproof and heat insulating performance. The purpose of the fifth embodiment is to provide a heat insulating covering layer that can withstand high temperatures of 1200° C. The flame resistance of products produced through this process is above UL94-V0, and the highest heat resistant temperature can reach 1200° C. When the high temperature hot spot temperature is about 650 degrees and the product thickness is 2.78 mm, the heat insulation temperature drops to below 200 degrees Celsius.

Figure 9:
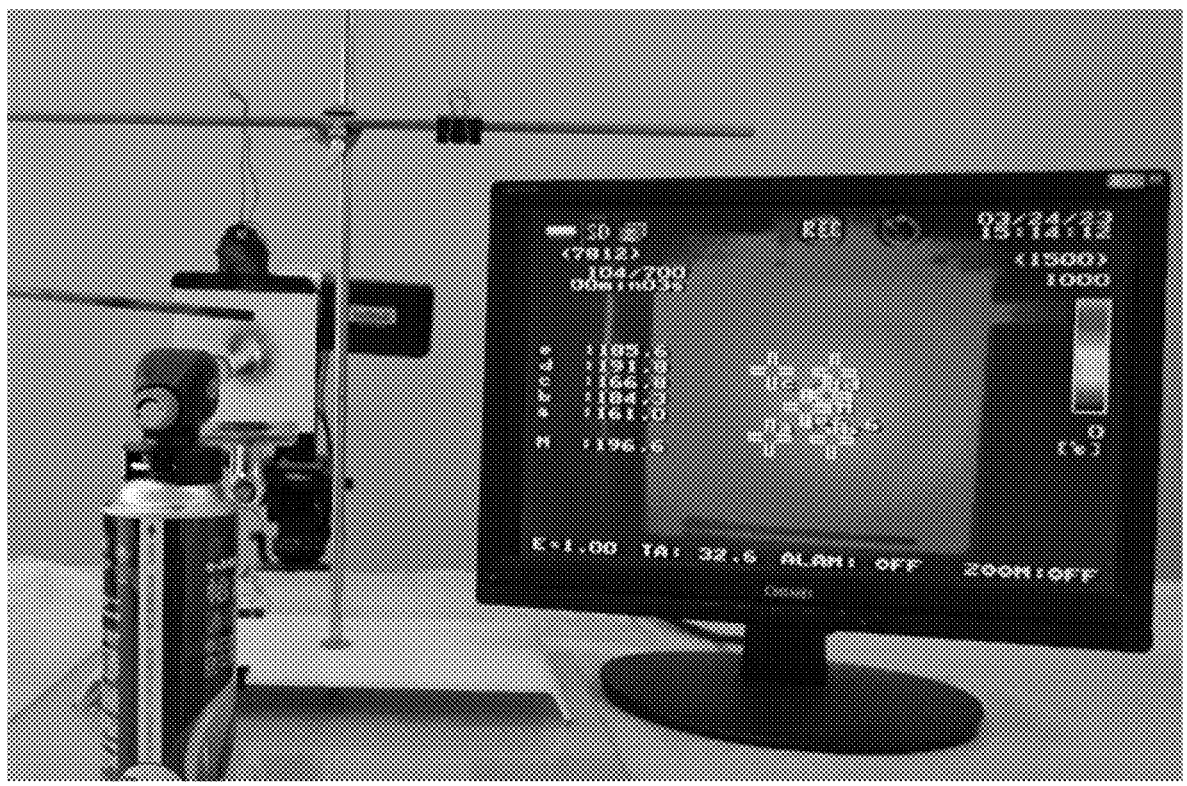
FIG. 9 is a schematic diagram of the fireproof and heat insulation test of the product of the fifth embodiment of the present invention under a high temperature flame.

Referring to FIG. 9, the product of the fifth embodiment is tested for fireproof and heat insulation under a high temperature flame, wherein the hot spot temperature of the test flame is about 650° C., and the thickness of the product of the fifth embodiment is 2.78 mm. After the test for 3 minutes under the high temperature flame, the product does not have the behavior of general organic matter burning and cracking at high temperature and the generation of carbide smoke during the combustion process. After the product is insulated, the temperature on the back of the product drops below 200° C., showing that the developed product has excellent performance of the fireproof and heat insulation effect, which can be applied to the thermal runaway prevention of electric vehicle lithium battery modules.

It is to be understood that the foregoing descriptions of the embodiments are given by way of example only, and various modifications may be made by those skilled in the art to which this field pertains. The above specification and examples provide a complete description of the flow of exemplary embodiments of the invention and their uses. Although the above embodiments disclose specific embodiments of the present invention, they are not intended to limit the present invention. Those with ordinary knowledge in the technical field to which the present invention pertains, without departing from the principle and spirit of the present invention, can make various changes and modifications to it, so the protection scope of the present invention should be defined by the appended claims.

What is claimed is:

1. A method for preparing a high temperature resistant material covering aerogel insulation composite material, comprising:

a mixing hydrolysis step: adding a siloxane precursor to an aqueous ethanol solution to form a mixed solution, wherein the siloxane precursor comprises a hydrophobic modified siloxane compound with different hydrophobic chain lengths, a siloxane compound or a combination thereof, and then adding an acid catalyst to the mixed solution to carry out a hydrolysis reaction;

a condensation dispersion step: adding a dispersion solution to the mixed solution, and the dispersion solution comprises an alkali catalyst so as to carry out a condensation reaction to form a dispersion sol solution, and then adding a water-dispersible high temperature resistant adhesive material to the dispersion sol solution to obtain the dispersion sol solution containing the high temperature resistant adhesive material, wherein the high temperature resistant adhesive material can withstand a high temperature above 300° C.;

a structure molding step: injecting the dispersion sol solution containing the high temperature resistant adhesive material into a preformed model, and promoting a further condensation of the dispersion sol solution containing the high temperature resistant adhesive material in the preformed model to form a preformed structure of a like-solid aerogel wet glue, wherein the preformed model comprises a shaping mold or a shaping mold containing fibrous materials, and the fibrous materials comprises one or a combination of porous cotton, mat, paper, blanket, rope, thick plate prepared by selecting from a group consisting of metal fibers, inorganic fibers, liquid crystal fibers, organic fibers on a scale of micron to nanometer and a combination thereof;

an atmospheric pressure drying step: drying the preformed structure of the like-solid aerogel wet glue under atmospheric pressure and a drying temperature to obtain an aerogel preformed material, which comprises an aerogel sheet or an aerogel/fiber composite sheet, wherein the drying temperature is between 60° C. and 150° C.;

an outer layer covering step: preparing a high temperature resistant adhesive material solution, wherein the high temperature resistant adhesive material in the high temperature resistant adhesive material solution can withstand a high temperature above 300° C., and coating the high temperature resistant adhesive material solution on a surface of a non-organic film, a non-organic sheet or a high temperature resistant fiber above 300° C., so that the high temperature resistant adhesive material solution is evenly distributed on the surface of the non-organic film, the non-organic sheet or the high temperature resistant fiber above 300° C., and then further using the non-organic film, the non-organic sheet or the high temperature resistant fiber above 300° C. coated with the high temperature resistant adhesive solution to cover the aerogel preformed material, wherein the non-organic film, the non-organic sheet or the high temperature resistant fiber above 300° C. can be proceeded to cover the aerogel preformed material with one single layer, multiple layers or a laminate stack for multi-layer lamination so as to form a composite material of the high temperature resistant material above 300° C. covering the aerogel preformed material;

a curing molding step: making solvent in the composite material of the high temperature resistant material above 300° C. covering the aerogel preformed material vaporize at a solvent drying temperature of the high temperature resistant adhesive material solution, wherein the solvent drying temperature is between 60~115° C., and then using a curing molding temperature to implement the step of curing and molding of the high temperature resistant adhesive material solution, wherein the curing molding temperature is higher than the solvent drying temperature, so as to form a high temperature resistant film above 300° C. covering the aerogel preformed composite material; and a surface treatment step: treating a surface of the high temperature resistant film above 300° C. covering the aerogel preformed composite material with polish, air-jet, and surface sprayed aerogel fireproof and heat-insulating coatings, so that the combination of cleaning and surface protection processes is performed to form a high temperature resistant fiber cloth above 300° C. or a high temperature resistant film/high temperature resistant sheet multi-layer above 300° C. covering aerogel molding composite material.

2. The method as claimed in claim 1, wherein if the high temperature resistant adhesive solution is a room temperature curing type, the non-organic film, the non-organic sheet, or the high temperature resistant fiber above 300° C. coated with the high temperature resistant adhesive solution is solidified during a solvent vaporization process so as to obtain an aerogel composite material for dust-free of clean rooms and safety protection of electric vehicles.

3. The method as claimed in claim 1, wherein the curing molding step comprises:

a solvent drying step: making solvent in the composite material of the high temperature resistant material above 300° C. covering the aerogel preformed material formed by the non-organic film, the non-organic sheet or the high temperature resistant fiber above 300° C. coated with the high temperature resistant adhesive material solution covering the aerogel preformed material vaporize at the solvent drying temperature of the high temperature resistant adhesive material solution; and a crosslinking curing step: making the non-organic film, the non-organic sheet or the high temperature resistant fiber above 300° C. coated with the high temperature resistant adhesive solution covering the outside of the aerogel preformed material proceed a crosslinking curing reaction to combine with each other under a temperature from 120° C. to 330° C. for crosslinking and curing, so that the high temperature resistant film above 300° C. covering aerogel preformed composite material will be obtained after the crosslinking curing reaction, which has a like-fiber reinforced resin (LFRP) high temperature resistant coating surface layer without shedding dust in the exterior and an aerogel sheet or aerogel/fiber composite material in the interior.

4. The method as claimed in claim 3, wherein the siloxane compound is tetramethoxysilane (TMOS), tetraethoxysilane (TEOS) or a combination thereof; the hydrophobic modified siloxane compound is methyltrimethoxysilane (MTMS), propyltrimethoxysilane (PTMS), hexyltrimethoxysilane (HTMS), octyltrimethoxysilane (OTMS), hexamethyldisilazane (HMDS) or a combination thereof, which are hydrophobic siloxanes substituted with different alkyl chain lengths, wherein the molar ratio of the siloxane compound to the hydrophobic modified siloxane compound is between 0:100 mol % and 40:60 mol %.

5. The method as claimed in claim 3, wherein the high temperature resistant adhesive material comprises one or a combination of inorganic glue, thermoplastic resin or thermosetting resin; the inorganic glue comprises water glass, inorganic silicone resin, copper oxide-phosphate glue, silicate glue, phosphoric acid-silicate glue, sulfate glue or magnesium oxide-silica-borax inorganic glue; the thermosetting resin comprises epoxy resin or polyimide; the thermoplastic resin comprises polyetherimide, polyphenylene oxide, polyphenylene sulfide, polyether ketone liquid crystal polymer, polytetrafluoroethylene, polymelamine, polyphenolic, polymelamine-formaldehyde, polyamide, polyamide ester or silica gel.

6. The method as claimed in claim 3, wherein the fiber materials comprise one or a combination of porous loose cotton, mat, paper, blanket, rope or thick board prepared by selecting from a group consisting of metal fibers, inorganic fibers, liquid crystal fibers, organic fibers, metal fibers, glass fibers, carbon fibers, quartz fibers, ceramic fibers, rock wool fibers, polyamide fibers, nylon fibers, polyester fibers, biodegradable inorganic fibers, biodegradable organic fibers and a combination thereof.

7. The method as claimed in claim 3, wherein the non-organic film and the non-organic sheet comprise one or a combination of a metal film and/or sheet, an inorganic film and/or sheet, and an organic-inorganic composite high temperature resistant film and/or sheet; the metal film and/or sheet comprises one or a combination of aluminum, stainless steel, and copper foil; the inorganic film and/or sheet comprises one or a combination of films or sheets prepared by selecting from a group consisting of mica sheets, graphite, graphene, glass ceramics, metal oxides, metal nitrogen silicon compounds, metal carbon silicon compounds and a combination thereof; the organic-inorganic composite high temperature resistant film comprises one or a combination of aluminum foil, stainless steel foil, copper foil, mica sheet, graphite sheet, graphene sheet, glass sheet, ceramic sheet, high temperature resistant films and/or sheets made of metal and metal oxide particles and glue; the high temperature resistant fibers above 300° C. comprises one or a combination of porous loose cotton, mat, paper, blanket, rope or thick board prepared by selecting from a group consisting of quartz fibers, glass fibers, ceramic fibers, and carbon fibers; the organic fibers comprises nylon fibers, polyester fibers, polyfluorine fibers, polyamide fibers, biodegradable inorganic fibers, biodegradable organic fibers and a combination thereof.

8. The method as claimed in claim 3, wherein the high temperature resistant film covering comprises single-layer covering, multi-layer covering or multi-layer various stack covering of the high temperature resistant film lamination in the high temperature resistant film covering aerogel composite material, wherein the high temperature resistant film covering aerogel composite material is a like-fiber reinforced plastic (LFRP) inorganic covering silicon-based aerogel composite material so as to be applied to high temperature processes in clean rooms and safety protection for thermal runaway of lithium battery modules for electric vehicles.

9. The method as claimed in claim 1, wherein the atmospheric pressure step comprises:
a vaporization step: placing the preformed structure of the like-solid aerogel wet glue in an environment with an azeotropic vaporization temperature, and making the solvent in the preformed structure of the like-solid aerogel wet glue azeotropically vaporize so as to distill and dry the solvent, wherein the azeotropic vaporization temperature is 60~90° C.;
a solvent recovery step: guiding a vapor of an azeotropic aqueous alcohol solution to a heat exchange recovery device to condense and recover an aqueous alcohol; and
a bumping step: adjusting a temperature of the preformed structure of a dry aerogel to a bumping temperature, so that solvent and water molecules contained in the preformed structure of the dry aerogel is rapidly bumped, and a positive vapor pressure is generated to promote an aerogel structure to suppress drying shrinkage and produce micro-thin pores so as to obtain the aerogel preformed material, wherein the bumping temperature is 110~150° C.

10. The method as claimed in claim 9, wherein the siloxane compound is tetramethoxysilane (TMOS), tetraethoxysilane (TEOS) or a combination thereof; the hydrophobic modified siloxane compound is methyltrimethoxysilane (MTMS), propyltrimethoxysilane (PTMS), hexyltrimethoxysilane (HTMS), octyltrimethoxysilane (OTMS), hexamethyldisilazane (HMDS) or a combination thereof, which are hydrophobic siloxanes substituted with different alkyl chain lengths, wherein the molar ratio of the siloxane compound to the hydrophobic modified siloxane compound is between 0:100 mol % and 40:60 mol %.

11. The method as claimed in claim 9, wherein the high temperature resistant adhesive material comprises one or a combination of inorganic glue, thermoplastic resin or thermosetting resin; the inorganic glue comprises water glass, inorganic silicone resin, copper oxide-phosphate glue, silicate glue, phosphoric acid-silicate glue, sulfate glue or magnesium oxide-silica-borax inorganic glue; the thermosetting resin comprises epoxy resin or polyimide; the thermoplastic resin comprises polyetherimide, polyphenylene oxide, polyphenylene sulfide, polyether ketone liquid crystal polymer, polytetrafluoroethylene, polymelamine, polyphenolic, polymelamine-formaldehyde, polyamide, polyamide ester or silica gel.

12. The method as claimed in claim 9, wherein the fiber materials comprise one or a combination of porous loose cotton, mat, paper, blanket, rope or thick board prepared by selecting from a group consisting of metal fibers, inorganic fibers, liquid crystal fibers, organic fibers, metal fibers, glass fibers, carbon fibers, quartz fibers, ceramic fibers, rock wool fibers, polyamide fibers, nylon fibers, polyester fibers, biodegradable inorganic fibers, biodegradable organic fibers and a combination thereof.

13. The method as claimed in claim 9, wherein the non-organic film and the non-organic sheet comprise one or a combination of a metal film and/or sheet, an inorganic film and/or sheet, and an organic-inorganic composite high temperature resistant film and/or sheet; the metal film and/or sheet comprises one or a combination of aluminum, stainless steel, and copper foil; the inorganic film and/or sheet comprises one or a combination of films or sheets prepared by selecting from a group consisting of mica sheets, graphite, graphene, glass ceramics, metal oxides, metal nitrogen silicon compounds, metal carbon silicon compounds and a combination thereof; the organic-inorganic composite high temperature resistant film comprises one or a combination of aluminum foil, stainless steel foil, copper foil, mica sheet, graphite sheet, graphene sheet, glass sheet, ceramic sheet, high temperature resistant films and/or sheets made of metal and metal oxide particles and glue; the high temperature resistant fibers above 300° C. comprises one or a combination of porous loose cotton, mat, paper, blanket, rope or thick board prepared by selecting from a group consisting of quartz fibers, glass fibers, ceramic fibers, and carbon fibers; the organic fibers comprises nylon fibers, polyester fibers, polyfluorine fibers, polyamide fibers, biodegradable inorganic fibers, biodegradable organic fibers and a combination thereof.

14. The method as claimed in claim 9, wherein the high temperature resistant film covering comprises single-layer covering, multi-layer covering or multi-layer various stack covering of the high temperature resistant film lamination in the high temperature resistant film covering aerogel composite material, wherein the high temperature resistant film covering aerogel composite material is a like-fiber reinforced plastic (LFRP) inorganic covering silicon-based aerogel composite material so as to be applied to high temperature processes in clean rooms and safety protection for thermal runaway of lithium battery modules for electric vehicles.

15. The method as claimed in claim 1, wherein when the high temperature resistant adhesive material solution comprises inorganic adhesive resin or thermosetting resin, the curing molding step further comprises:
a normal temperature crosslinking curing step: in the normal temperature environment, the solvent is vaporized and a curing agent is cross-linked and cured, so that the high temperature resistant film at a temperature from 120° C. to 330° C. covering the aerogel preformed composite material can be obtained after curing; or
a high temperature crosslinking curing step: at a crosslinking curing temperature, the thermosetting resin and the non-organic film, the non-organic sheet, or internal fibers of the high temperature resistant fiber above 300° C. are combined and cured by a chemical reaction; when the thermosetting resin is epoxy, the crosslinking curing temperature is a series of crosslinking curing temperatures of 150~180° C.; when the thermosetting resin is polyimide, the crosslinking curing temperature is a series of crosslinking curing temperatures of 120~325° C.; a high temperature resistant film covering aerogel preformed composite material can be obtained after curing and crosslinking.

16. The method as claimed in claim 1, wherein the siloxane compound is tetramethoxysilane (TMOS), tetraethoxysilane (TEOS) or a combination thereof; the hydrophobic modified siloxane compound is methyltrimethoxysilane (MTMS), propyltrimethoxysilane (PTMS), hexyltrimethoxysilane (HTMS), octyltrimethoxysilane (OTMS), hexamethyldisilazane (HMDS) or a combination thereof, which are hydrophobic siloxanes substituted with different alkyl chain lengths, wherein the molar ratio of the siloxane compound to the hydrophobic modified siloxane compound is between 0:100 mol % and 40:60 mol %.

17. The method as claimed in claim 1, wherein the high temperature resistant adhesive material comprises one or a combination of inorganic glue, thermoplastic resin or thermosetting resin; the inorganic glue comprises water glass, inorganic silicone resin, copper oxide-phosphate glue, silicate glue, phosphoric acid-silicate glue, sulfate glue or magnesium oxide-silica-borax inorganic glue; the thermosetting resin comprises epoxy resin or polyimide; the thermoplastic resin comprises polyetherimide, polyphenylene oxide, polyphenylene sulfide, polyether ketone liquid crystal polymer, polytetrafluoroethylene, polymelamine, polyphenolic, polymelamine-formaldehyde, polyamide, polyamide ester or silica gel.

18. The method as claimed in claim 1, wherein the fiber materials comprise one or a combination of porous loose cotton, mat, paper, blanket, rope or thick board prepared by selecting from a group consisting of metal fibers, inorganic fibers, liquid crystal fibers, organic fibers, metal fibers, glass fibers, carbon fibers, quartz fibers, ceramic fibers, rock wool fibers, polyamide fibers, nylon fibers, polyester fibers, biodegradable inorganic fibers, biodegradable organic fibers and a combination thereof.

19. The method as claimed in claim 1, wherein the non-organic film and the non-organic sheet comprise one or a combination of a metal film and/or sheet, an inorganic film and/or sheet, and an organic-inorganic composite high temperature resistant film and/or sheet; the metal film and/or sheet comprises one or a combination of aluminum, stainless steel, and copper foil; the inorganic film and/or sheet comprises one or a combination of films or sheets prepared by selecting from a group consisting of mica sheets, graphite, graphene, glass ceramics, metal oxides, metal nitrogen silicon compounds, metal carbon silicon compounds and a combination thereof; the organic-inorganic composite high temperature resistant film comprises one or a combination of aluminum foil, stainless steel foil, copper foil, mica sheet, graphite sheet, graphene sheet, glass sheet, ceramic sheet, high temperature resistant films and/or sheets made of metal and metal oxide particles and glue; the high temperature resistant fibers above 300° C. comprises one or a combination of porous loose cotton, mat, paper, blanket, rope or thick board prepared by selecting from a group consisting of quartz fibers, glass fibers, ceramic fibers, and carbon fibers; the organic fibers comprises nylon fibers, polyester fibers, polyfluorine fibers, polyamide fibers, biodegradable inorganic fibers, biodegradable organic fibers and a combination thereof.

20. The method as claimed in claim 1, wherein the high temperature resistant film covering comprises single-layer covering, multi-layer covering or multi-layer various stack covering of the high temperature resistant film lamination in the high temperature resistant film covering aerogel composite material, wherein the high temperature resistant film covering aerogel composite material is a like-fiber reinforced plastic (LFRP) inorganic covering silicon-based aerogel composite material so as to be applied to high temperature processes in clean rooms and safety protection for thermal runaway of lithium battery modules for electric vehicles.

* * * * *